US009467196B2

(12) United States Patent
Imbornone et al.

(10) Patent No.: US 9,467,196 B2
(45) Date of Patent: Oct. 11, 2016

(54) QUADRATURE CURRENT-COMBINING LINEARIZING CIRCUIT FOR GENERATING ARBITRARY PHASE AND AMPLITUDE

(71) Applicant: QUALCOMM Incorporated, San Diego, CA (US)

(72) Inventors: James Francis Imbornone, Methuen, MA (US); Xinwei Wang, Dunstable, MA (US); Marc Gerald Dicicco, Dunstable, MA (US); Frederic Carrez, Boxborough, MA (US); Zhenying Luo, Westford, MA (US); Xiangdong Zhang, Westford, MA (US)

(73) Assignee: Qualcomm Incorporated, San Diego, CA (US)

( * ) Notice: Subject to any disclaimer, the term of this patent is extended or adjusted under 35 U.S.C. 154(b) by 114 days.

(21) Appl. No.: 14/173,085

(22) Filed: Feb. 5, 2014

(65) Prior Publication Data

US 2015/0222319 A1    Aug. 6, 2015

(51) Int. Cl.
*H04B 1/40*   (2015.01)
*H04B 1/48*   (2006.01)
*H04B 1/04*   (2006.01)
*H04B 1/00*   (2006.01)

(52) U.S. Cl.
CPC .............. *H04B 1/48* (2013.01); *H04B 1/0475* (2013.01); *H04B 1/0057* (2013.01); *H04B 2001/485* (2013.01)

(58) Field of Classification Search
CPC . H04B 1/48; H04B 2001/485; H04B 1/0475
USPC ................ 455/73, 77, 78, 83, 87, 91, 114.1, 455/114.3, 120, 125, 130, 193.2, 193.3, 455/197.2, 67.16
See application file for complete search history.

(56) References Cited

U.S. PATENT DOCUMENTS

| 3,808,517 | A  | 4/1974  | Fletcher et al. |
| 4,288,763 | A  | 9/1981  | Hopfer |
| 6,346,853 | B1 | 2/2002  | Kangaslahti et al. |
| 6,522,221 | B1 | 2/2003  | Hayashi |
| 7,098,751 | B1* | 8/2006 | Wong ................... H03B 5/1231 331/117 R |
| 7,282,979 | B2* | 10/2007 | Tanaka ..................... H03H 7/20 327/231 |
| 7,332,961 | B2 | 2/2008  | Blednov et al. |
| 7,548,136 | B1 | 6/2009  | Shah |

(Continued)

FOREIGN PATENT DOCUMENTS

GB           1083275 A         9/1967

OTHER PUBLICATIONS

Grebennikov A., "Linearity Improvement Techniques for Wireless Transmitters: Part 2," High Frequency Electronics, Linearization Methods, Jun. 2009, pp. 44-53.

(Continued)

*Primary Examiner* — Tuan Pham
(74) *Attorney, Agent, or Firm* — Smith Tempel Blaha LLC

(57) ABSTRACT

A device includes a first circuit path coupled to a first node and a second node, the first circuit path having at least one first varactor circuit configured to receive a first tuning voltage, the first circuit path having a resistor with a selectable value, and a second circuit path coupled to the first node and the second node, the second circuit path having at least one second varactor circuit configured to receive a second tuning voltage, the second circuit path having a capacitor with a selectable value.

18 Claims, 16 Drawing Sheets

(56) References Cited

U.S. PATENT DOCUMENTS

| | | | |
|---|---|---|---|
| 2008/0031382 A1* | 2/2008 | Aoki | 375/300 |
| 2008/0290465 A1* | 11/2008 | de Vreede | 257/597 |
| 2009/0002076 A1* | 1/2009 | Hayashi | H04L 25/0272 330/304 |
| 2009/0079524 A1* | 3/2009 | Cyr | H01L 24/48 334/78 |
| 2010/0321137 A1 | 12/2010 | Rangarajan et al. | |
| 2011/0254638 A1 | 10/2011 | Manssen et al. | |
| 2013/0137383 A1 | 5/2013 | Kobayashi | |

OTHER PUBLICATIONS

International Search Report and Written Opinion—PCT/US2015/014050—ISA/EPO—May 18, 2015.

* cited by examiner

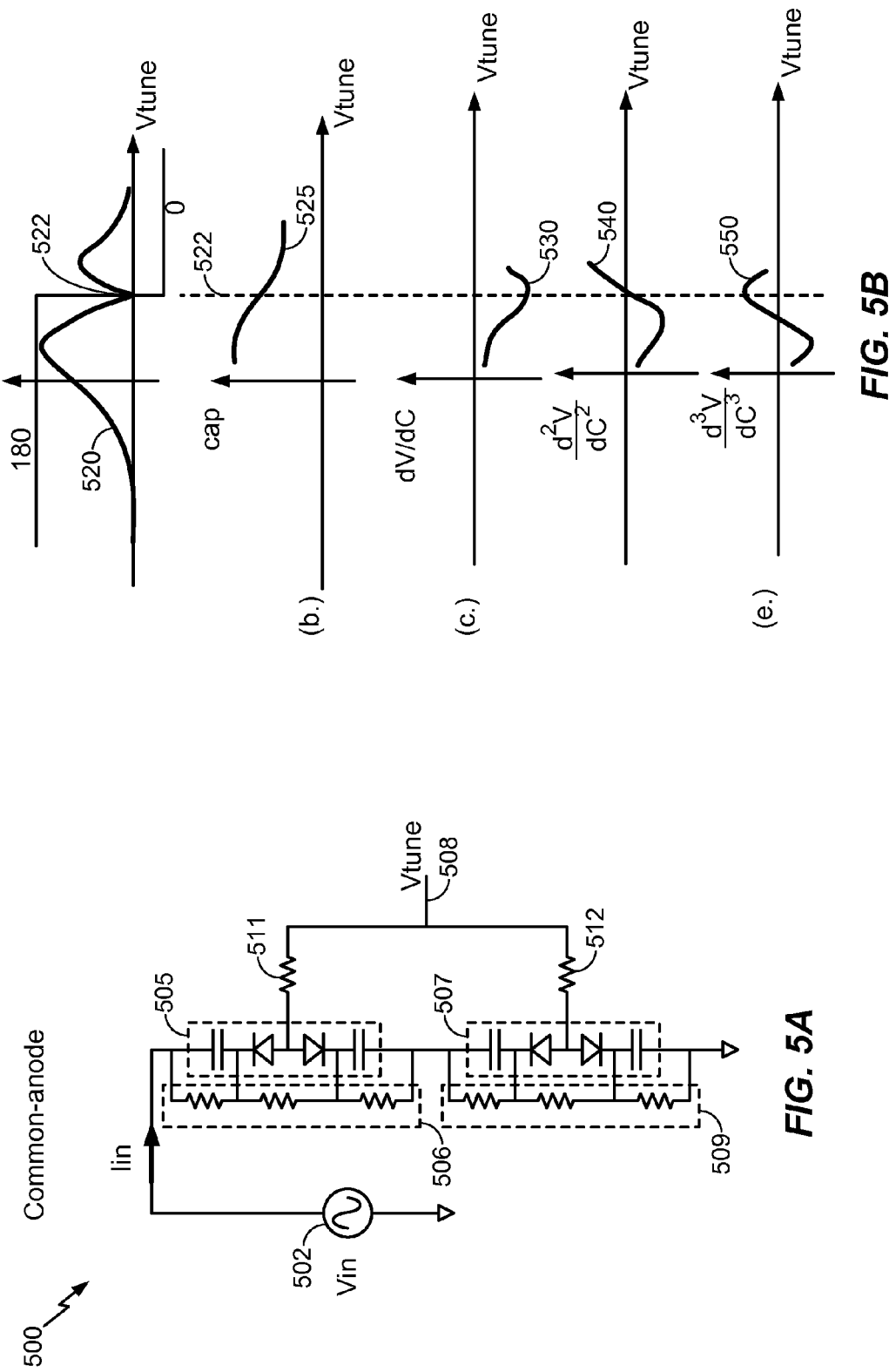

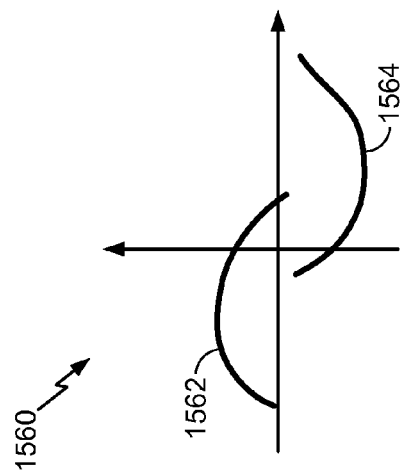
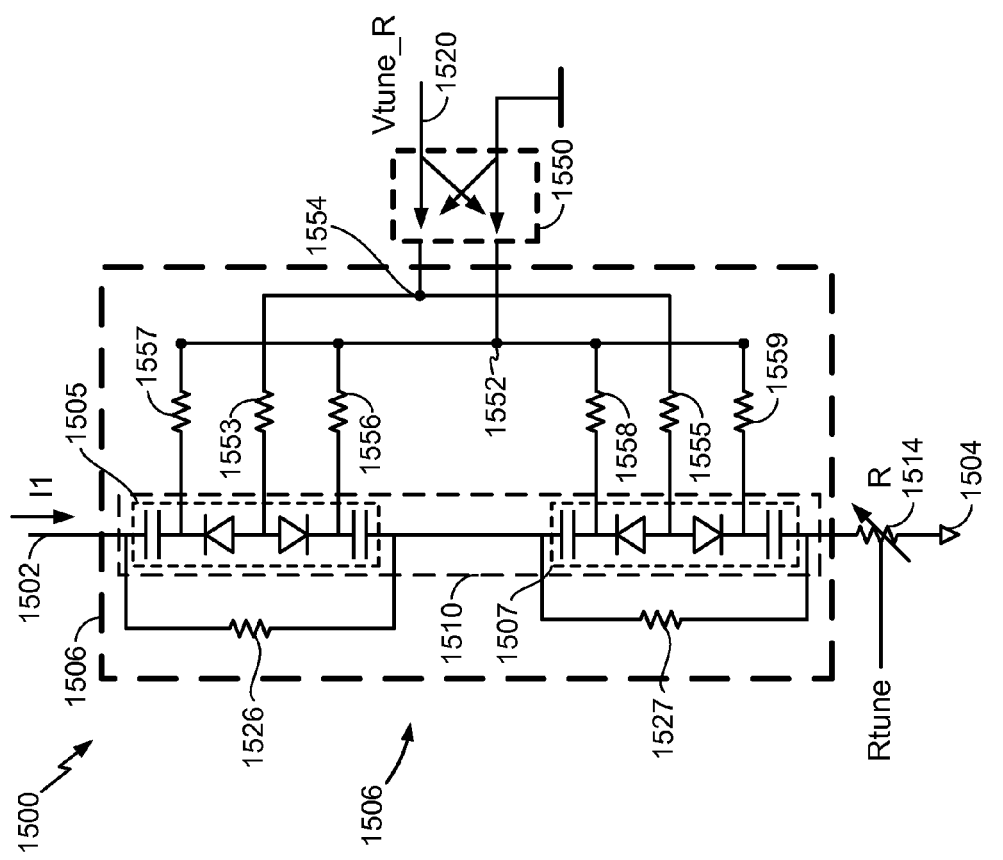

QUADRATURE CURRENT-COMBINING LINEARIZING CIRCUIT FOR GENERATING ARBITRARY PHASE AND AMPLITUDE

BACKGROUND

1. Field

The present disclosure relates generally to electronics, and more specifically to transmitters and receivers.

2. Background

A radio frequency (RF) transceiver generally includes transmit circuitry and receive circuitry connected to a transducer, such as an antenna, through a switching apparatus. The switching apparatus may comprise passive and/or active circuit elements that allow the transmit circuitry to deliver a transmit signal to the antenna, and that allow the antenna to deliver a receive signal to the receive circuitry. In some implementations, this switching apparatus can be referred to as a transmit/receive (TR or TRx) switch, and can form part of what is referred to as an RF front end of the transceiver. An RF front end may comprise some or all of a power amplifier (PA) to amplify a transmit signal, a low noise amplifier (LNA) to amplify a receive signal, one or more filter structures to allow the simultaneous passage of transmit and receive signals, a TR switch, and an antenna. A typical TR switch comprises both series and shunt devices to control the passage of both transmit and receive signals.

During operation, the TR switch may create non-linear components that can interfere with the transmit signal and, to a lesser extent, with the receive signal. Other sources of non-linearities include, for example, the power amplifier (PA), the substrate on which the transceiver is fabricated, one or more filter structures, and other elements. In addition, interfering RF signals, referred to as "jammer signals" or "jammers" may also create non-linear products at the RF front end. All of these non-linear products, when occurring as a third-order function, give rise to what is referred to as third-order intermodulation distortion (IM3), which can degrade the third-order intercept point (IP3). The IP3 is a measure of non-linearity of the RF front end as it relates to third-order intermodulation products. These non-linear products can make it difficult for the RF front end to meet linearity standards and meet other performance criteria. One of the challenges of minimizing these third-order non-linear products is that they may occur in a variety of locations in the RF front end, with each different location having a signal with a different phase and amplitude.

Currently, a varactor-based linearizer is used to linearize the shunt devices in a TR switch, but is only effective when the varactor-based linearizer shares the same node as the shunt devices and when there is no phase shift between them because it relies on exact 180 degree cancelation between the TR switch and the linearizer as the linearizer does not have phase adjustment capability.

Therefore, it would be desirable to have a linearizing circuit that can be located in a variety of places in the RF front end, and that can be adjusted for a variety of phase and amplitude conditions.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

FIGS. 5A and 5B are schematic diagrams illustrating a conventional common-anode varactor linearizer arrangement.

FIG. 15A is a schematic diagram illustrating another alternative exemplary embodiment of the linearizing circuit of FIG. 7A.

FIG. 15B is a graphical diagram showing example tuning of the linearizing circuit of FIG. 15A.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used herein, the terms "transducer" and "transducer element" refer to an antenna element that can be stimulated with a feed current to radiate electromagnetic energy, and an antenna element that can receive electromagnetic energy and convert the received electromagnetic energy to a receive current that is applied to receive circuitry.

As used herein, the terms "interfering signal," "jammer," "jammer signal," and "TX jammer" are used to describe a signal present at a receiver that can degrade the receiver's performance in detecting and downconverting a desired receive signal.

As used herein, the term "HD3" refers to third order harmonic distortion; the term "IM3" refers to third order intermodulation distortion and the term "IP3" refers to the third-order intercept point.

Exemplary embodiments of the disclosure are directed toward a quadrature current-combining linearizing circuit (also referred to herein as a "linearizing circuit" and a "varactor linearizer") that can generate an arbitrary phase and amplitude and that can be used to cancel both third order harmonic distortion (HD3) and third order intermodulation distortion (IM3) in a radio frequency (RF) transceiver. The ability to generate any phase and amplitude allows the exemplary embodiments of the circuit to be located anywhere between the antenna and the active transmit and receive circuits. While applicable to both transmit and receive circuits, the exemplary embodiments of the quadrature current-combining linearizing circuit will be described in the context of canceling third-order products in a transmit circuit.

Figure 1:
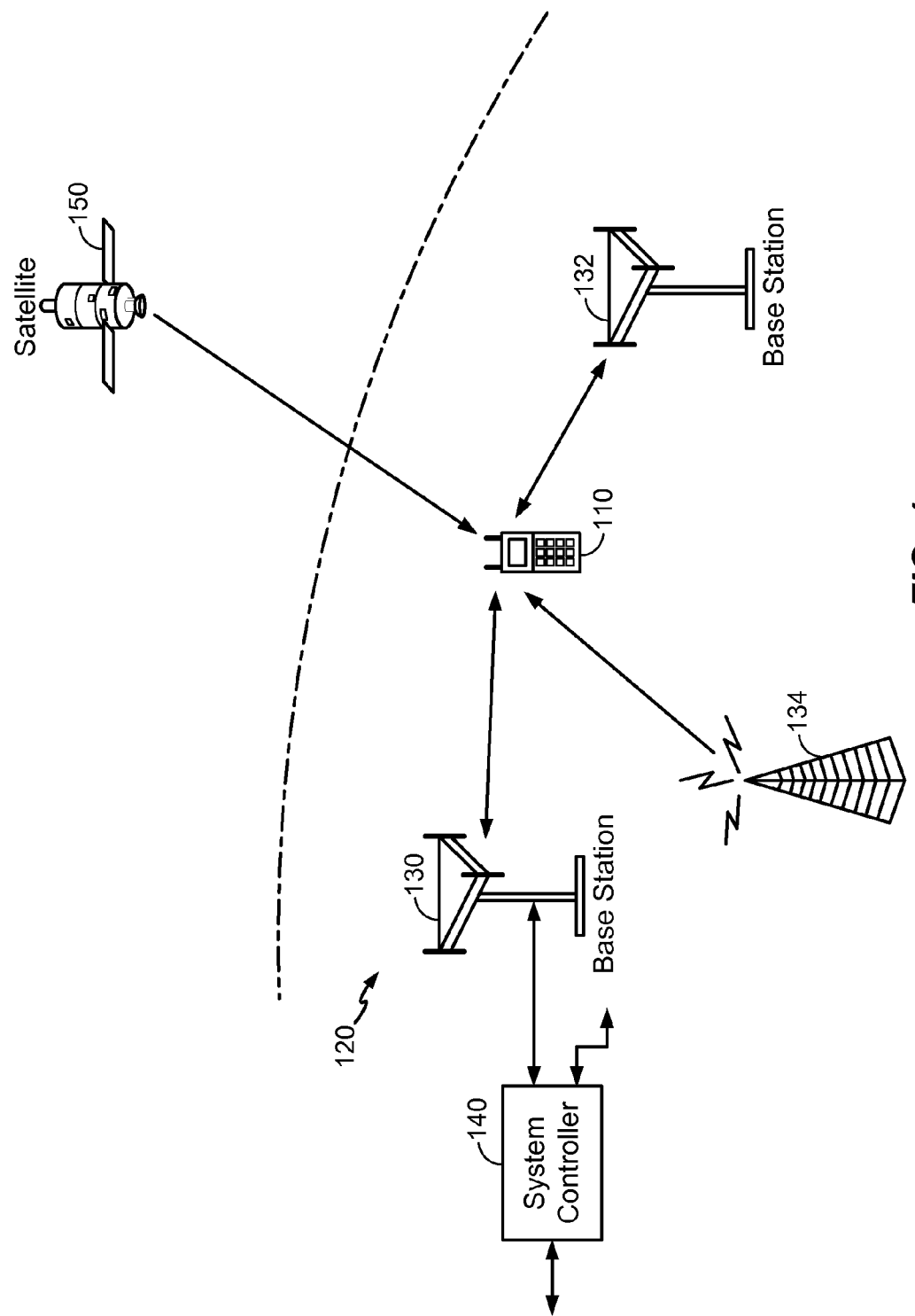
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. Wireless device 110 may communicate with wireless communication system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Wireless device 110 may support carrier aggregation, which is operation on multiple carriers. Carrier aggregation may also be referred to as multi-carrier operation. Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 960 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz and may include one or more carriers. Each carrier may cover up to 20 MHz in LTE. LTE Release 11 supports 35 bands, which are referred to as LTE/UMTS bands and are listed in 3GPP TS 36.101. Wireless device 110 may be configured with up to five carriers in one or two bands in LTE Release 11.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
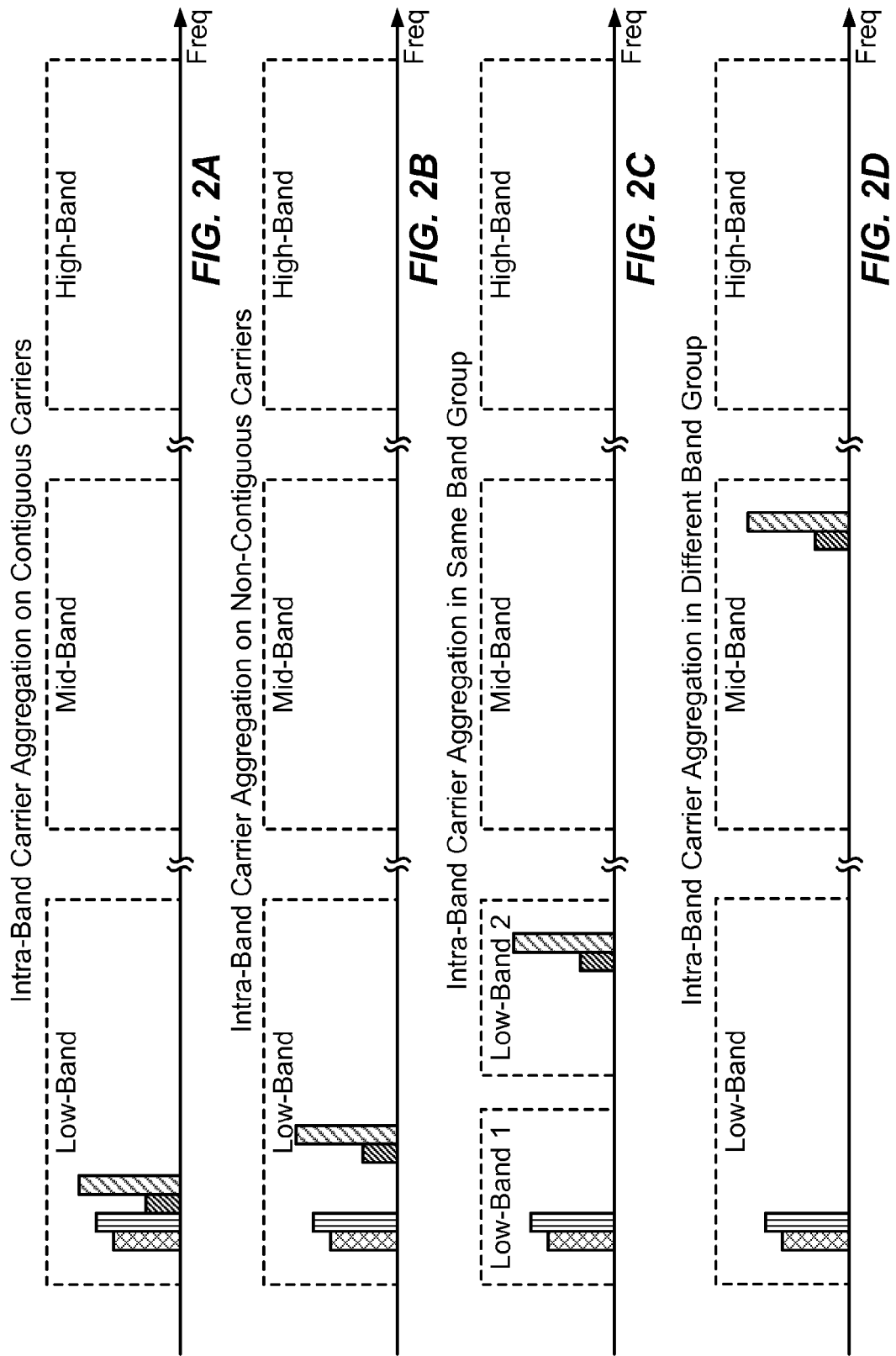
FIG. 2A is a graphical diagram showing an example of contiguous intra-band carrier-aggregation (CA).
FIG. 2B is a graphical diagram showing an example of non-contiguous intra-band CA.
FIG. 2C is a graphical diagram showing an example of inter-band CA in the same band group.
FIG. 2D is a graphical diagram showing an example of inter-band CA in different band groups.

FIG. 2A is a graphical diagram showing an example of contiguous intra-band carrier-aggregation (CA). In the example shown in FIG. 2A, wireless device 110 is configured with four contiguous carriers in one band in low-band. Wireless device 110 may send and/or receive transmissions on the four contiguous carriers within the same band.

FIG. 2B is a graphical diagram showing an example of non-contiguous intra-band CA. In the example shown in FIG. 2B, wireless device 110 is configured with four non-contiguous carriers in one band in low-band. The carriers may be separated by 5 MHz, 10 MHz, or some other amount. Wireless device 110 may send and/or receive transmissions on the four non-contiguous carriers within the same band.

FIG. 2C is a graphical diagram showing an example of inter-band CA in the same band group. In the example shown in FIG. 2C, wireless device 110 is configured with four carriers in two bands in low-band. Wireless device 110 may send and/or receive transmissions on the four carriers in different bands in the same band group.

FIG. 2D is a graphical diagram showing an example of inter-band CA in different band groups. In the example shown in FIG. 2D, wireless device 110 is configured with four carriers in two bands in different band groups, which include two carriers in one band in low-band and two carriers in another band in mid-band. Wireless device 110 may send and/or receive transmissions on the four carriers in different bands in different band groups.

FIGS. 2A to 2D show four examples of carrier aggregation. Carrier aggregation may also be supported for other combinations of bands and band groups.

Figure 3:
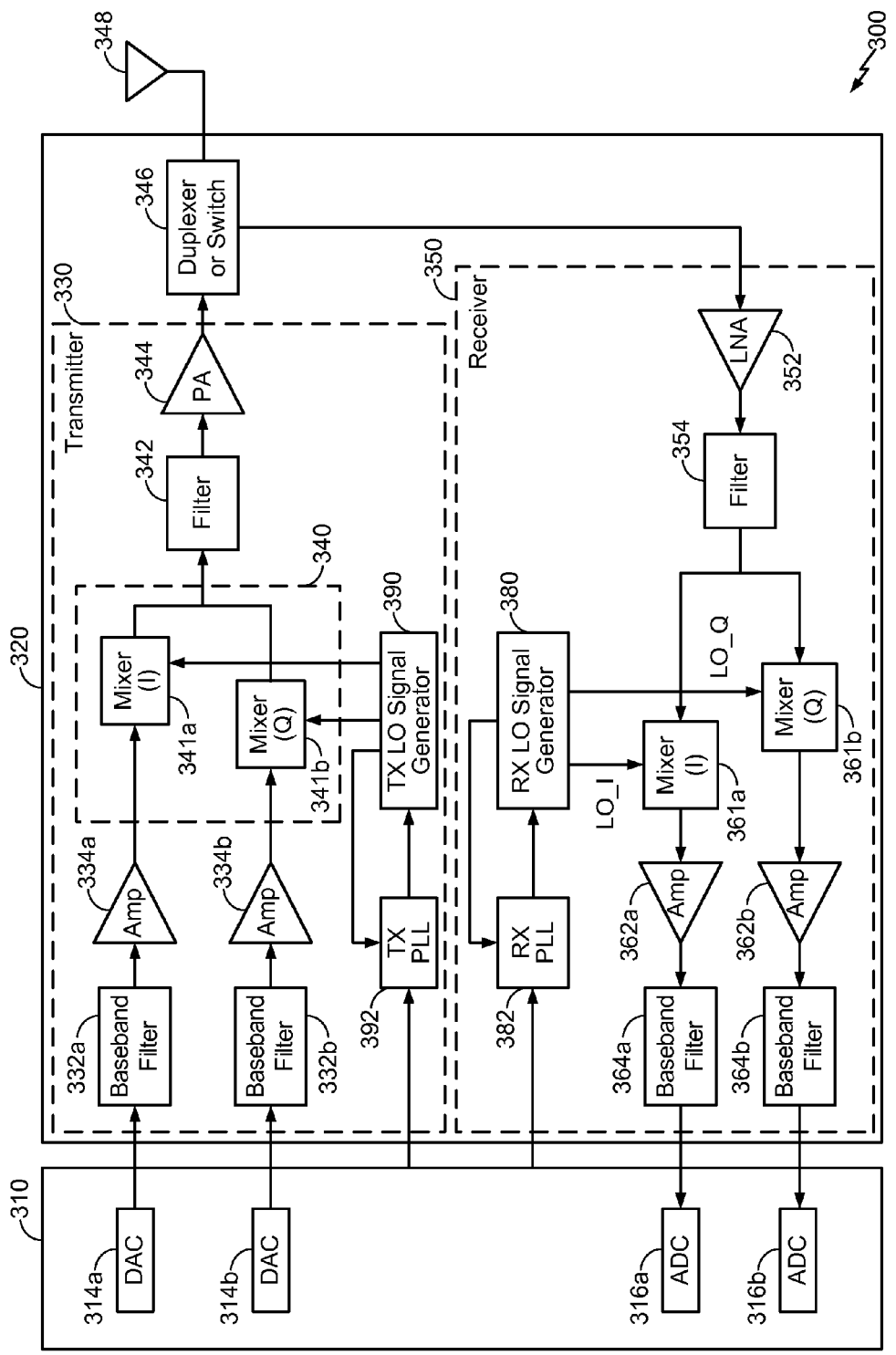
FIG. 3 is a block diagram of an exemplary design of wireless device in FIG. 1.

FIG. 3 is a block diagram showing a wireless communication device 300 in which the exemplary circuits and techniques of the present disclosure may be implemented. FIG. 3 shows an example of a transceiver 320. In general, the conditioning of the signals in a transmitter 330 and a receiver 350 may be performed by one or more stages of amplifier, filter, upconverter, downconverter, etc. These circuit blocks may be arranged differently from the configuration shown in FIG. 3. Furthermore, other circuit blocks not shown in FIG. 3 may also be used to condition the signals in the transmitter 330 and receiver 350. Unless otherwise noted, any signal in FIG. 3, or any other figure in the drawings, may be either single-ended or differential. Some circuit blocks in FIG. 3 may also be omitted.

In the example shown in FIG. 3, wireless device 300 generally comprises a transceiver 320 and a data processor 310. The data processor 310 may include a memory (not shown) to store data and program codes, and may generally comprise analog and digital processing elements. The transceiver 320 includes a transmitter 330 and a receiver 350 that support bi-directional communication. In general, wireless device 300 may include any number of transmitters and/or receivers for any number of communication systems and frequency bands. All or a portion of the transceiver 320 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 3, transmitter 330 and receiver 350 are implemented with the direct-conversion architecture.

In the transmit path, the data processor 310 processes data to be transmitted and provides in-phase (I) and quadrature (Q) analog output signals to the transmitter 330. In an exemplary embodiment, the data processor 310 includes digital-to-analog-converters (DAC's) 314a and 314b for converting digital signals generated by the data processor 310 into the I and Q analog output signals, e.g., I and Q output currents, for further processing.

Within the transmitter 330, baseband filters 332a and 332b filter the I and Q analog transmit signals, respectively, to remove undesired images caused by the prior digital-to-analog conversion. The baseband filters 332a and 332b can be lowpass filters or bandpass filters, depending on the implementation. Amplifiers (Amp) 334a and 334b amplify the signals from baseband filters 332a and 332b, respectively, and provide I and Q baseband signals. An upconverter 340 upconverts the I and Q baseband signals with I and Q transmit (TX) local oscillator (LO) signals from a TX LO signal generator 390 and provides an upconverted signal. A filter 342 filters the upconverted signal to remove undesired images caused by the frequency upconversion as well as noise in a receive frequency band. A power amplifier (PA) 344 amplifies the signal from filter 342 to obtain the desired output power level and provides a transmit RF signal. The transmit RF signal is routed through a duplexer or switch 346 and transmitted via an antenna 348.

In the receive path, antenna 348 receives communication signals and provides a received RF signal, which is routed through duplexer or switch 346 and provided to a low noise amplifier (LNA) 352. The duplexer 346 is designed to operate with a specific RX-to-TX duplexer frequency separation, such that RX signals are isolated from TX signals. The received RF signal is amplified by LNA 352 and filtered by a filter 354 to obtain a desired RF input signal. Downconversion mixers 361a and 361b mix the output of filter 354 with I and Q receive (RX) LO signals (i.e., LO_I and LO_Q) from an RX LO signal generator 380 to generate I and Q baseband signals. The I and Q baseband signals are amplified by amplifiers 362a and 362b and further filtered by baseband filters 364a and 364b to obtain I and Q analog input signals, which are provided to data processor 310. The baseband filters 364a and 364b can be lowpass filters or bandpass filters, depending on the implementation. In the exemplary embodiment shown, the data processor 310 includes analog-to-digital-converters (ADC's) 316a and 316b for converting the analog input signals into digital signals to be further processed by the data processor 310.

In FIG. 3, TX LO signal generator 390 generates the I and Q TX LO signals used for frequency upconversion, while RX LO signal generator 380 generates the I and Q RX LO signals used for frequency downconversion. Each LO signal is a periodic signal with a particular fundamental frequency. A phase locked loop (PLL) 392 receives timing information from data processor 310 and generates a control signal used to adjust the frequency and/or phase of the TX LO signals from LO signal generator 390. Similarly, a PLL 382 receives timing information from data processor 310 and generates a control signal used to adjust the frequency and/or phase of the RX LO signals from LO signal generator 380.

Wireless device 300 may support CA and may (i) receive multiple downlink signals transmitted by one or more cells on multiple downlink carriers at different frequencies and/or (ii) transmit multiple uplink signals to one or more cells on multiple uplink carriers. In an exemplary embodiment, the wireless device 300 supports intra-carrier aggregation and can use a single LO signal to downconvert multiple intra-CA receive signals.

Figure 4B:
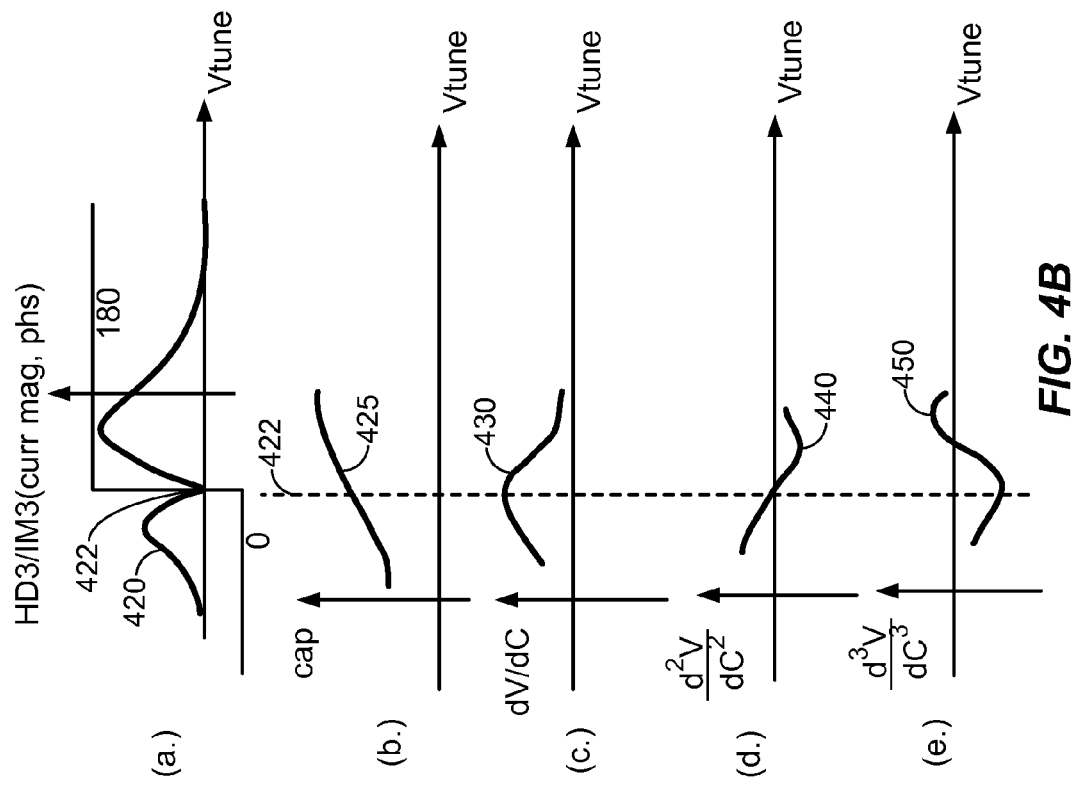
FIGS. 4A and 4B are schematic diagrams illustrating a conventional common-cathode varactor linearizer arrangement.
Figure 4A:
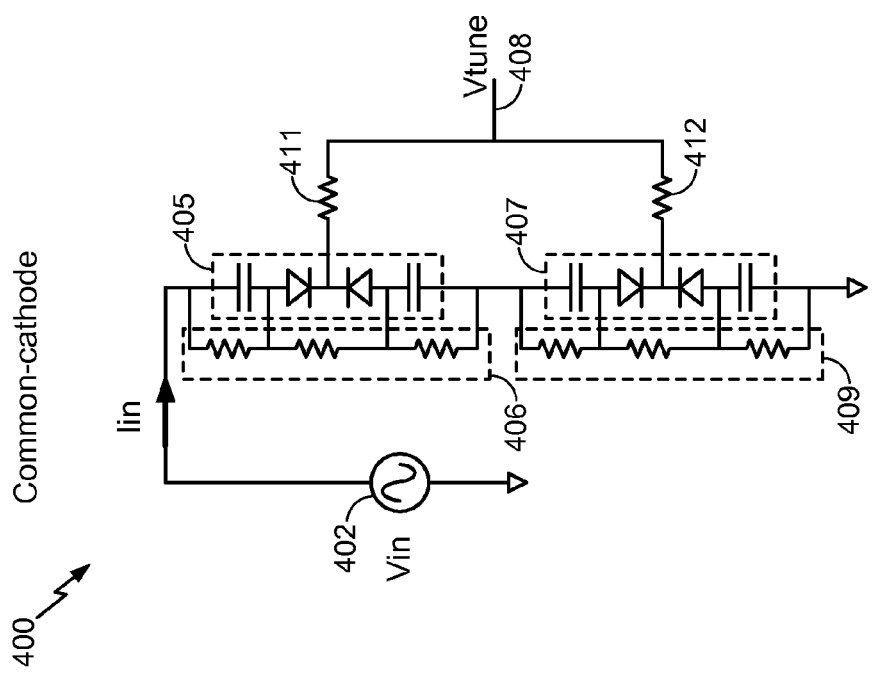

FIGS. 4A and 4B are schematic diagrams illustrating a conventional common-cathode varactor linearizer arrangement. A varactor diode can be constructed with either a PN junction in reverse bias or can be implemented using a metal-oxide semiconductor field effect transistor (MOSFET) device where the gate is considered the anode and the source and drain are connected together and are considered the cathode. In both cases, these structures are such that their capacitance varies with the applied reverse voltage. As used herein, the term "varactor diode" represents any of a reverse-biased PN junction and a MOSFET type varactor. A voltage source 402, Vin, generates a current, Iin, that flows through the diode groups 405 and 407. A tuning voltage, Vtune, on connection 408 is used to vary the capacitance of the diode groups 405 and 407. In this example, each diode group 405 and 407 comprises two diodes and two capacitors to accommodate the desired voltage swing. More of fewer diodes can comprise each diode group. Resistances 406 associated with the first diode group 405, and resistances 409 associated with the second diode group 407 establish the electrical behavior of the diode groups 405 and 407, respectively. Resistances 411 and 412 control the tuning voltage on connection 408.

The curve 420 in FIG. 4B shows the third order distortion current, either HD3 or IM3, magnitude and phase as a function of Vtune. The curve 420 in FIG. 4B is generated as a function of how the capacitance of the common-cathode linearizer of FIG. 4A changes as a function of Vtune. The curve 425 shows that as Vtune increases from zero to a positive voltage the capacitance transitions from a convex shape to a concave shape. This capacitance behavior can be illustrated by the $1^{st}$ through $3^{rd}$ derivatives, shown respectively as curves 430, 440 and 450 in FIG. 4B. The $1^{st}$ derivative 430 has zero slope at the inflection point 422 marking the transition between convex and concave. Similarly, the $2^{nd}$ derivative 440 crosses zero at the inflection point 422. Lastly, the $3^{rd}$ derivative 450 has a slope opposite the slope of the $1^{st}$ derivative 430 below the inflection point 422 as compared to above it. This leads to 180 degree phase shift in the third order distortion current just above and below the inflection point as seen by the curve 420. Note also that the relatively large peak third order distortion current above and below the inflection point 422 is a result of the large slopes associated with the third derivative of capacitance with respect to voltage.

FIGS. 5A and 5B are schematic diagrams illustrating a conventional common-anode varactor linearizer arrangement. A voltage source 502 generates a current, Iin, that flows through the diode groups 505 and 507. A tuning voltage, Vtune, on connection 508 is used to vary the capacitance of the diode groups 505 and 507. In this example, each diode group 505 and 507 comprises two diodes and two capacitors to accommodate the desired voltage swing. More of fewer diodes can comprise each diode group. Resistances 506 associated with the first diode group 505, and resistances 509 associated with the second diode group 507 establish the electrical behavior of the diode groups 505 and 507, respectively. Resistances 511 and 512 control the tuning voltage on connection 508.

The operation of the common-anode linearizer 500 is similar to the operation of the common cathode linearizer 400 described above, with the main difference being that in the common-anode linearizer, the capacitance versus Vtune voltage slope transitions from concave to convex (see curve 525 in FIG. 5B) as the tuning voltage, Vtune, increases from zero to a positive value.

A shown by the $1^{st}$ through $3^{rd}$ derivative curves 530, 540 and 550, the phase transition at the inflection point 522 is the opposite for the common-anode arrangement as compared to the common-cathode arrangement 400. The explanation as to why there are relatively large peaks in the third order distortion current above and below the inflection point follows in a similar manner as described above for the common-cathode example.

Figure 6:
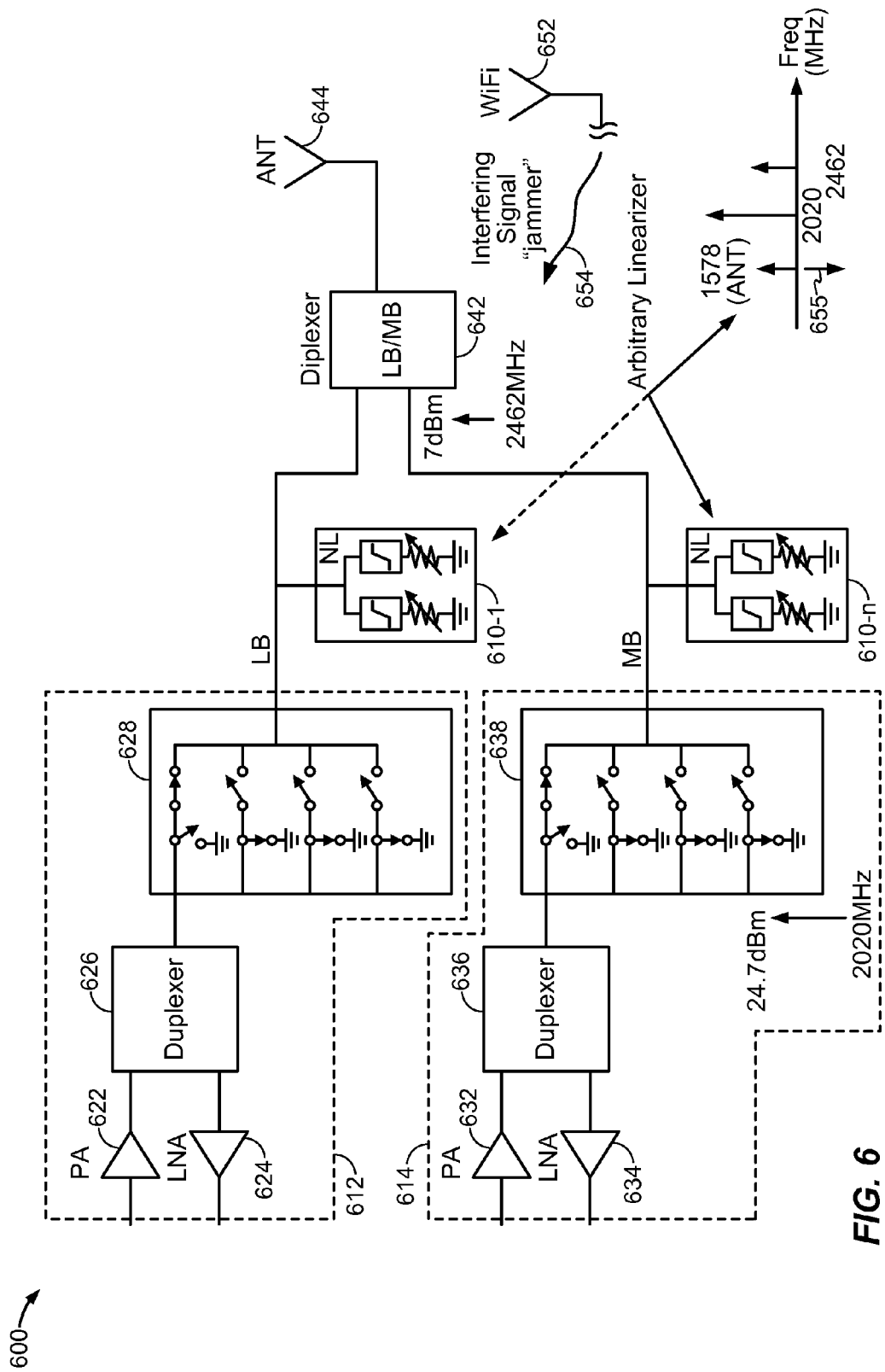
FIG. 6 is a schematic diagram illustrating a simplified transceiver front end in which an exemplary embodiment of a linearizing circuit can be implemented.

FIG. 6 is a schematic diagram illustrating a simplified transceiver front end in which exemplary embodiments of the linearizing circuit can be implemented. In this simplified example, the front end 600 includes a low band path 612 and a mid-band path 614. More or fewer paths are possible, with two paths shown for exemplary purposes only. The low band path 612 includes a power amplifier 622, a low noise amplifier 624 a duplexer 626 and a transmit/receive (T/R) switch 628. The power amplifier 622 provides a transmit signal to the duplexer 626. The duplexer 626 also provides a receive signal to the low noise amplifier 624. The duplexer 626 allows the simultaneous bi-directional communication of both transmit and receive signals over a single path.

The duplexer 626 is connected to the transmit/receive (TR) switch 628. The TR switch 628 comprises series and shunt devices to control the flow of the transmit and receive signals and provides a connection to a diplexer 642. The diplexer 642 is a passive device that implements frequency domain multiplexing that allows signals from both the low band path 612 and the mid-band path 614 to coexist without interfering with each other on an output port connected to an antenna 644.

The mid-band path 614 includes a power amplifier 632, a low noise amplifier 634 a duplexer 636 and a TR switch 638. The power amplifier 632 provides a transmit signal to the duplexer 636. The duplexer 636 also provides a receive signal to the low noise amplifier 634. The duplexer 636 is connected to the TR switch 638. The TR switch 638 comprises series and shunt devices to control the flow of the transmit and receive signals and provides a connection to the diplexer 642.

In an exemplary embodiment, a quadrature current-combining linearizing circuit will be referred to as a linearizing circuit 610. Exemplary embodiments of the linearizing circuit 610 can generate an arbitrary phase and amplitude to compensate for third order non-linearities that can occur anywhere in the front end 600. These third order non-linearities can occur in the form of a third order distortion current, either HD3 or IM3, having an arbitrary magnitude and phase. Because the embodiments of the linearizing circuit 610 can generate an arbitrary phase and amplitude, they can therefore, be located anywhere in the front end 600. A linearizing circuit 610-1 is arbitrarily connected to the TR switch 628 and a linearaizing circuit 610-n is arbitrarily connected to the TR switch 638. More or fewer instances of the linearizing circuit 610 may be implemented. In this exemplary embodiment, each instance of a linearizing circuit 610-1 through 610-n can be used to compensate for third-order non-linear products generated by elements in the low band path 612 and the mid-band path 614. The location at which the linearizing circuit 610-1 is connected and the location at which the linearizing circuit 610-n is connected is referred to as "arbitrary" because the linearizing circuit 610-1 can be connected anywhere in the front end. For example, the linearizing circuit 610-1 can be connected between the duplexer 626 and the TR switch 628, can be connected between the diplexer 642 and the antenna 644, or can be connected anywhere else. Similarly, the linearizing circuit 610-n can be connected between the duplexer 636 and the TR switch 638, can be connected between the diplexer 642 and the antenna 644, or can be connected anywhere else. Moreover, although two linearizing circuits 601-1 and 610-n are shown in FIG. 6, each path 612 and 614 need not have a linearizing circuit 610.

An illustrative interfering signal 654 is shown in FIG. 6 as originating from a secondary antenna 652. In this example, the antenna 652 can be configured to transmit a signal in the frequency range used for wireless fidelity (WiFi) transmissions, and this interfering signal can be referred to as a "jammer."

In this example, a jammer signal at a frequency 2462 MHz at a level of 7 dBm interferes with the mid-band desired signal which occurs at a frequency of 2020 MHz at a level of 24.7 dbm. The arrow 655 shows the contribution of the linearizing circuit 610-n compensating for the lower sideband intermodulation product created by the desired 2020 MHz signal and the 2462 MHz jammer (this $3^{rd}$ order distortion sideband occurs at 2(2020 MHz)−2462 MHz=1578 MHz). The linearizing circuit 610-n is used to create a non-linearity between the TR switch 638 and the diplexer 642 with the same magnitude but opposite phase as the non-linearity created by the jammer signal to cancel a non-linearity generated in the mid band path 614.

Figures 7A, 7B:
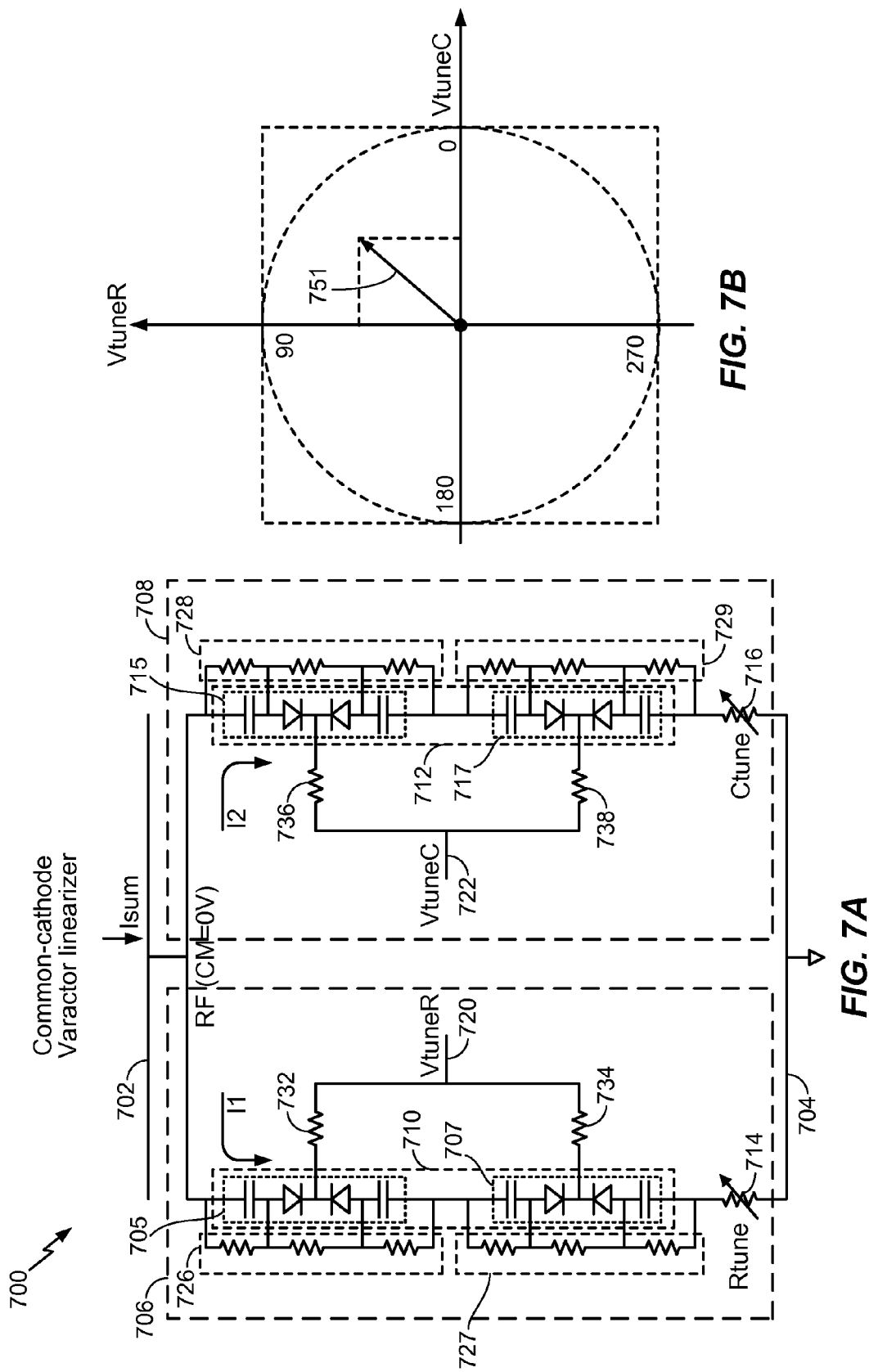
FIG. 7A is a schematic diagram illustrating an exemplary embodiment of a linearizing circuit.
FIG. 7B is a Cartesian coordinate diagram showing the ability of the linearizing circuit to operate over a range of 360 degrees and at an amplitude defined by a tuning voltage.

FIG. 7A is a schematic diagram illustrating an exemplary embodiment of a linearizing circuit 700.

The circuit 700 comprises a first node 702 and a second node 704. The first node 702 is referred to as a summing node and the second node 704 is connected to a common terminal. The circuit 700 also comprises a first circuit path 706, through which a first current, I1, flows, and a second circuit path 708 through which a second current, I2, flows. The first circuit path 706 includes a first varactor circuit 710 and the second circuit path 708 includes a second varactor circuit 712. The first varactor circuit 710 comprises diode groups 705 and 707, and the second varactor circuit 712 comprises diode groups 715 and 717. In an exemplary embodiment, each of the diode groups 705, 707, 715 and 717 comprises two diodes and two capacitors. However, more or fewer diodes and capacitors can be implemented in each diode group. In this exemplary embodiment, the varactor circuit 710 and the varactor circuit 712 are each connected in a common-cathode arrangement. However, in alternative embodiments, the varactor circuit 710 and the varactor circuit 712 can be connected in a common-anode arrangement, as described above. Whether the varactor circuit 710 and the varactor circuit 712 are connected in a common-anode arrangement or a common-cathode arrangement is a matter of design and implementation. Further, in this exemplary embodiment, the varactor circuit 710 and the varactor circuit 712 each comprise four diode devices. The number of diode devices in each of the varactor circuit 710 and the varactor circuit 712 can vary, and need not necessarily be equal. Generally, the number of diode devices depends on the voltage swing desired at the summing node 702.

Resistances 726 and 727 associated with the varactor circuit 710, and resistances 728 and 729 associated with the varactor circuit 712 establish the electrical behavior of the varactor circuit 710 and varactor circuit 712, respectively.

The first circuit path 706 also comprises a selectable resistance 714 and the second circuit path 708 also comprises a selectable capacitance 716. A tuning voltage, VtuneR is applied to the first varactor circuit 710 through resistances 732 and 734, via a tuning node 720 and a tuning voltage, VtuneC, is applied to the second varactor circuit 712 through resistances 736 and 738, via a tuning node 722. The current Isum at the summing node 702 represents the sum of the current I1 flowing through the first circuit path 706 and the current I2 flowing through the second circuit path 708. If the current flowing in the first circuit path 706 is predominately real (also referred to as resistive), then it is generally near zero phase. If the current flowing in the second circuit path 708 is predominately capacitive, then it is generally at a phase of 90 degrees relative to the current in the first circuit path 706. In other words, the current I1 is quadrature with respect to the current I2.

The value of the selectable resistance 714 is chosen to result in a 90 degree phase shift being imparted to the signal in the first circuit path 706 relative to the signal in the second circuit path 708. The value of the selectable capacitance 716 is chosen to result in a desired amplitude of the signal in the second circuit path 708. In this manner, the response of the signal at the summing node 702 can be adjusted to any amplitude and any phase using the tuning voltage, VtuneR and the tuning voltage VtuneC, thereby providing a current Isum at the summing node 702 that can compensate for any third order non-linearities in the transceiver front end. The values of VtuneR and VtuneC can be provided in a look up table (LUT) based on the frequencies of the communication bands.

As described above, the value of the selectable resistance 714 is chosen to provide a quadrature relationship between the current in the first circuit path 706 and second circuit path 708. The selectable tuning voltage VtuneR at node 720 is used to adjust the amplitude of the $3^{rd}$ order current in the first circuit path 706. The selectable capacitance, Ctune, 716 and the tuning voltage VtuneC at node 722 is used to adjust the amplitude of the $3^{rd}$ order current in the second circuit path 708. The summing node 702 combines the quadrature currents I1 and I2. In this manner, it is possible to adjust the amplitude of each of the quadrature current branches 706 and 708 to rotate the summed current anywhere on an arc from 0→90-degrees in a quadrant (via VtuneR and VtuneC); and it is possible to flip the phase of the current in each of the quadrature circuit paths 706 and 708 0/180 degrees to place the quadrature "arc" in any of four quadrants to have 360 degrees of circular coverage as shown by the graph in FIG. 7B. For example, equal contributions of the current I1 and I2 to Isum at the first node 702 result in the vector 751 being located at 45 degrees.

Figure 8:
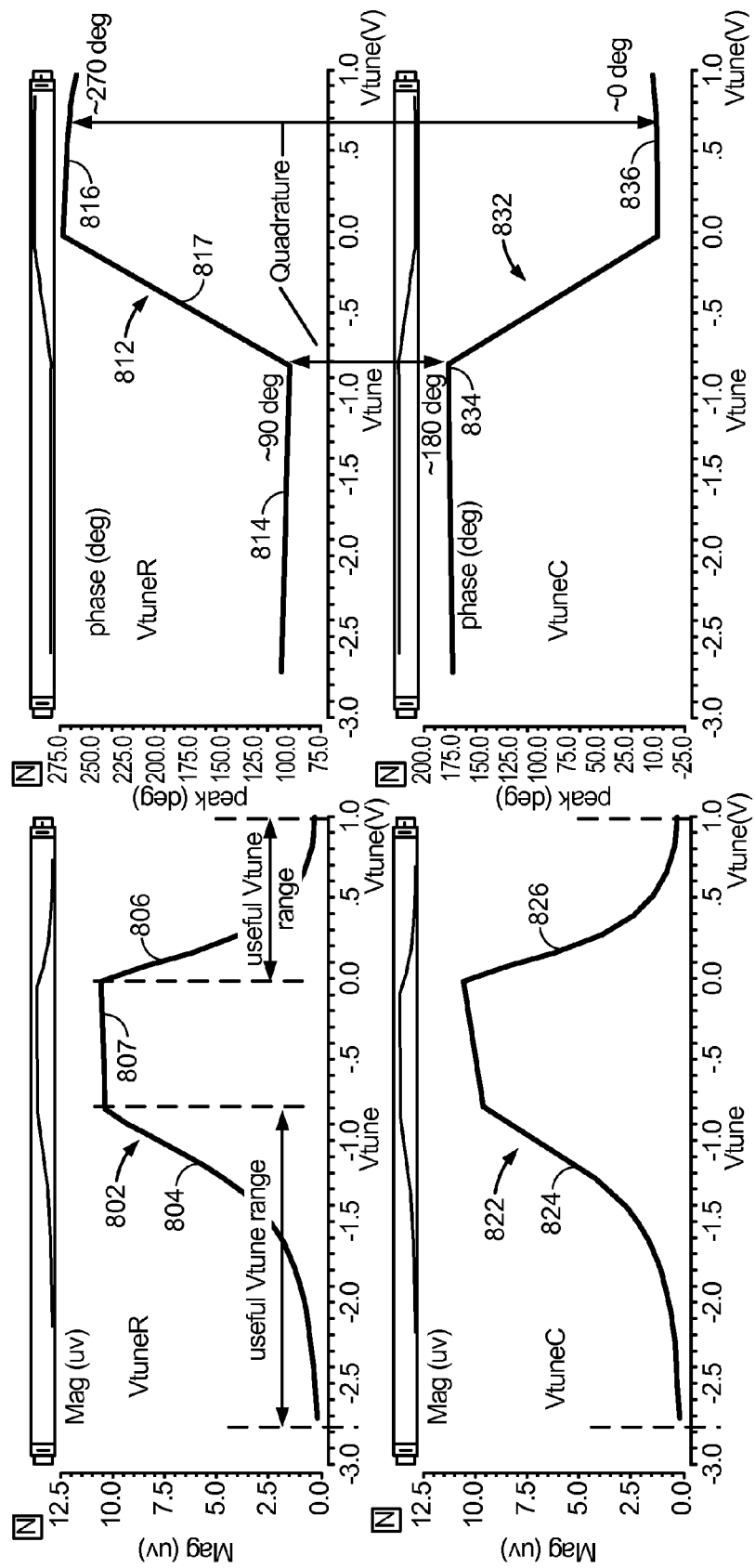
FIG. 8 shows graphical illustrations showing the relationship between tuning voltage and phase for the tuning voltages VtuneR and VtuneC.

FIG. 8 shows graphical illustrations showing the relationship between tuning voltage and phase for the tuning voltages VtuneR and VtuneC. The tuning voltage, VtuneR, and its corresponding $3^{rd}$ order voltage generated in a 50-Ohm load due to $3^{rd}$ order distortion current is shown using trace 802, which includes useful tuning ranges 804 and 806. The flat region 807 between the useful Vtune ranges was not simulated for this example. If it had been included in this plot it would have appeared like the steep v-shaped notch in the vicinity of the inflection point 422 as shown in FIG. 4B. It is the steepness and process variation of this notch which makes it undesirable to operate in and is the reason why it is omitted in FIG. 8. The effect of the tuning voltage, VtuneR, on the phase of the current through the resistive circuit path (first circuit path 706) is shown using the curve 812. The trace 812 shows a 180 degree phase change from the portion 814 to the portion 816, which occurs as VtuneR and VtuneC cross the inflection point. As mentioned above, the region 817 of the curve 812 between the region 814 and the region 816 was not simulated (and therefore omitted) for the same reason that the region 807 was omitted. Simulation would show a near vertical transition at a specific value of Vtune which is the transition point.

The tuning voltage, VtuneC, is shown using trace 822, which includes useful tuning ranges 824 and 826. The effect of the tuning voltage, VtuneC, on the phase of the current through the capacitive circuit path (second circuit path 708) is shown using the trace 832. The trace 832 shows a 180 phase change from the portion 834 to the portion 836. Further, the portion 814 of the trace 812 is 90 degrees out of phase with respect to the portion 834 of the trace 832; and the portion 816 of the trace 812 is 90 degrees out of phase with respect to the portion 836 of the trace 832. This illustrates the quadrature nature of the currents in the resistive and capacitive circuit paths 706 and 708, respectively.

Figure 9A:
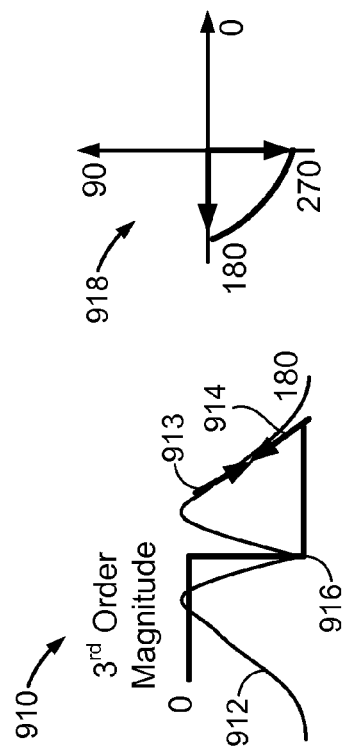
FIGS. 9A, 9B, 9C and 9D are graphical illustrations showing how phase rotation is achieved in each of the four quadrants.

FIGS. 9A through 9D are graphical illustrations showing how phase rotation is achieved in each of the four quadrants. In order to produce an arc that sweeps 90 degrees in each of the four quadrants, there are four combinations of voltage trajectories on the $3^{rd}$ order distortion versus Vtune curves for VtuneR and VtuneC. The requisite 180-degree phase shift that is used to have the ability to map the full 360-degrees comes from operating one or the other or both of the trajectories above or below the inflection point. FIG. 9A is a diagram 900 showing a curve 902 representing a composite third order distortion current in the first circuit path 706 and the second circuit path 708 for illustrative purposes only. The ninety degree arc (quadrant 1) 908 (between 0 and 90 degrees) is created when the tuning voltage VtuneR has the trajectory as indicated by the arrow 903 and the tuning voltage VtuneC has the trajectory as indicated by the arrow 904 on their respective tuning curves. Note that in this example, and for exemplary purposes only, the curve 902 is a composite curve and that there is a curve similar to curve 902 for each of the first circuit path 706 and the second circuit path 708. As evident by the arrows 903 and 904, it is desirable to have the tuning voltages VtuneR and VtuneC on the outer portion (i.e., away from the inflection point 906) of the curve 902.

Figure 9B:
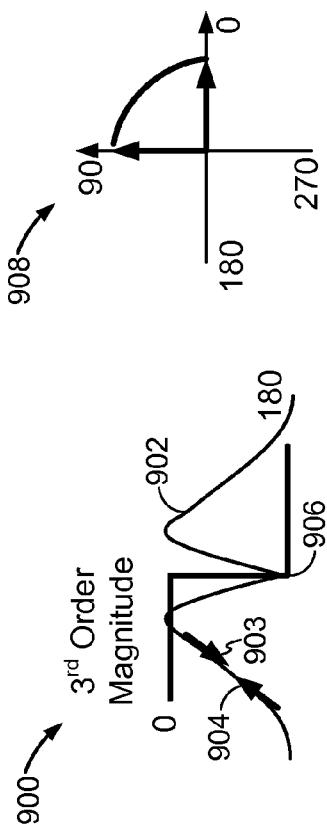

FIG. 9B is a diagram 910 showing a curve 912 representing a composite third order distortion current in the first circuit path 706 and the second circuit path 708 for illustrative purposes only. The ninety degree arc (quadrant 3) 918 (between 180 and 270 degrees) is created when the tuning voltage VtuneR has the trajectory as indicated by the arrow 913 and the tuning voltage VtuneC has the trajectory as indicated by arrow 914 on their respective tuning curves. Note that in this example, and for exemplary purposes only, the curve 912 is a composite curve and that there is a curve similar to 912 for each of the first circuit path 706 and the second circuit path 708 and the curve 912 shows both trajectories on the same curve for illustrative purposes only. As evident by the arrows 913 and 914, it is desirable to have the tuning voltages VtuneR and VtuneC on the outer portion (i.e., away from the inflection point 916) of the curve 912.

Figure 9C:
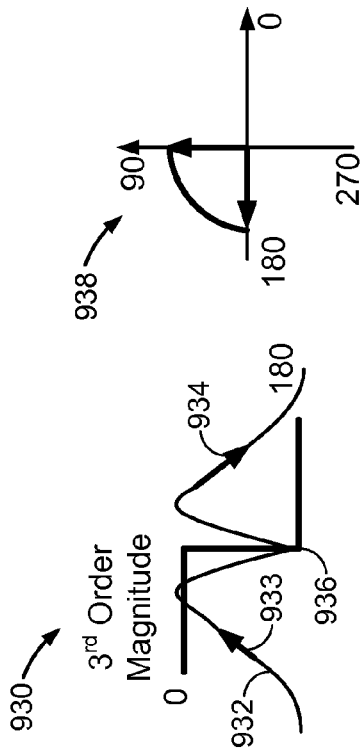

FIG. 9C is a diagram 920 showing a curve 922 representing a composite third order distortion current in the first circuit path 706 and the second circuit path 708 for illustrative purposes only. The ninety degree arc (quadrant 4) 928 (between 270 and 0 degrees) is created when the tuning voltage VtuneR has the trajectory as indicated by the arrow 923 and the tuning voltage VtuneC has the trajectory indicated by the arrow 924 on their respective tuning curves. Note that in this example, and for exemplary purposes only, the curve 922 is a composite curve and that there is a curve similar to curve 922 for each of the first circuit path 706 and the second circuit path 708 and the curve 922 shows both trajectories on the same curve for illustrative purposes only. As evident by the arrows 923 and 924, it is desirable to have the tuning voltages VtuneR and VtuneC on the outer portion (i.e., away from the inflection point 926) of the curve 922.

Figure 9D:
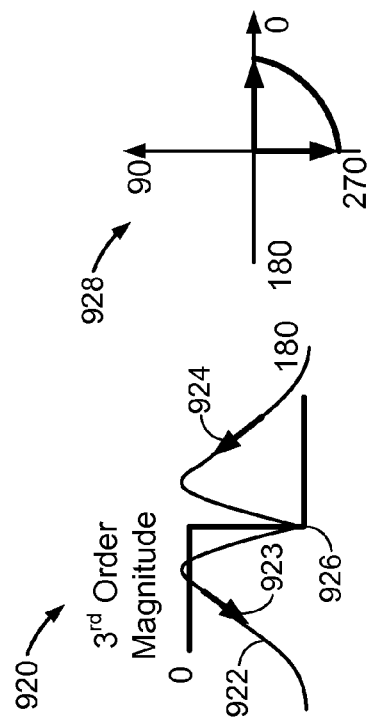

FIG. 9D is a diagram 930 showing a curve 932 representing a composite third order distortion current in the first circuit path 706 and the second circuit path 708 for illustrative purposes only. The ninety degree arc (quadrant 2) 938 (between 90 and 180 degrees) is created when the tuning voltage VtuneR has the trajectory as indicated by the arrow 933 and the tuning voltage VtuneC has the trajectory as indicated by the arrow 934 on their respective tuning curves. Note that in this example, and for exemplary purposes only, the curve 932 is a composite curve and that there is a curve similar to curve 932 for each of the first circuit path 706 and the second circuit path 708 and the curve 932 shows both trajectories on the same curve for illustrative purposes only. As evident by the arrows 933 and 934, it is desirable to have the tuning voltages VtuneR and VtuneC on the outer portion (i.e., away from the inflection point 936) of the curve 932.

Figure 10B:
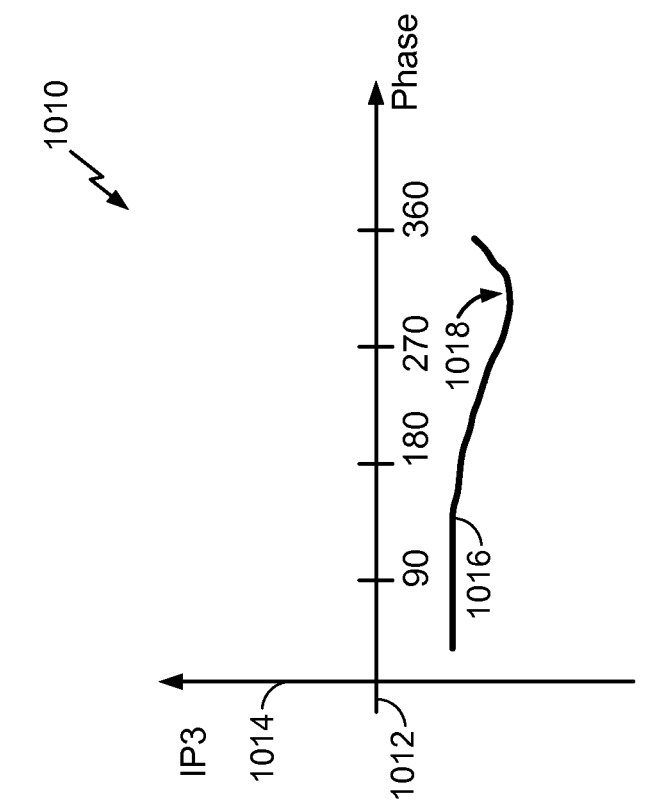
FIGS. 10A and 10B are diagrams illustrating the ability of an exemplary embodiment of the quadrature current-combining linearizing circuit to locate a desired phase at a fixed amplitude.
Figure 10A:
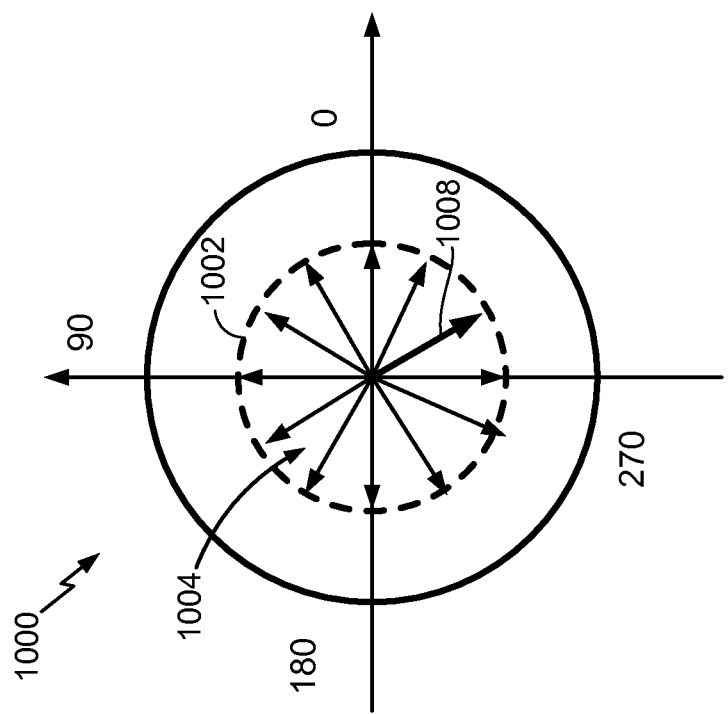

FIGS. 10A and 10B are diagrams illustrating the ability of an exemplary embodiment of the quadrature current-combining linearizing circuit to locate a desired phase at a fixed amplitude. The coordinate system 1000 shows a fixed arbitrary amplitude 1002, and a series of vectors 1004 that are swept through 360 degrees of phase. The graph 1010 shows phase on the abscissa 1012 and third order distortion on the ordinate 1014. The trace 1016 represents the third order distortion as the phase is swept through 360 degrees, where a shallow null 1018 is located approximately less than midway between 270 and 0 degrees in this example. The vector 1008 corresponding to the shallow null 1018 is shown in FIG. 10A.

Figures 11A, 11B:
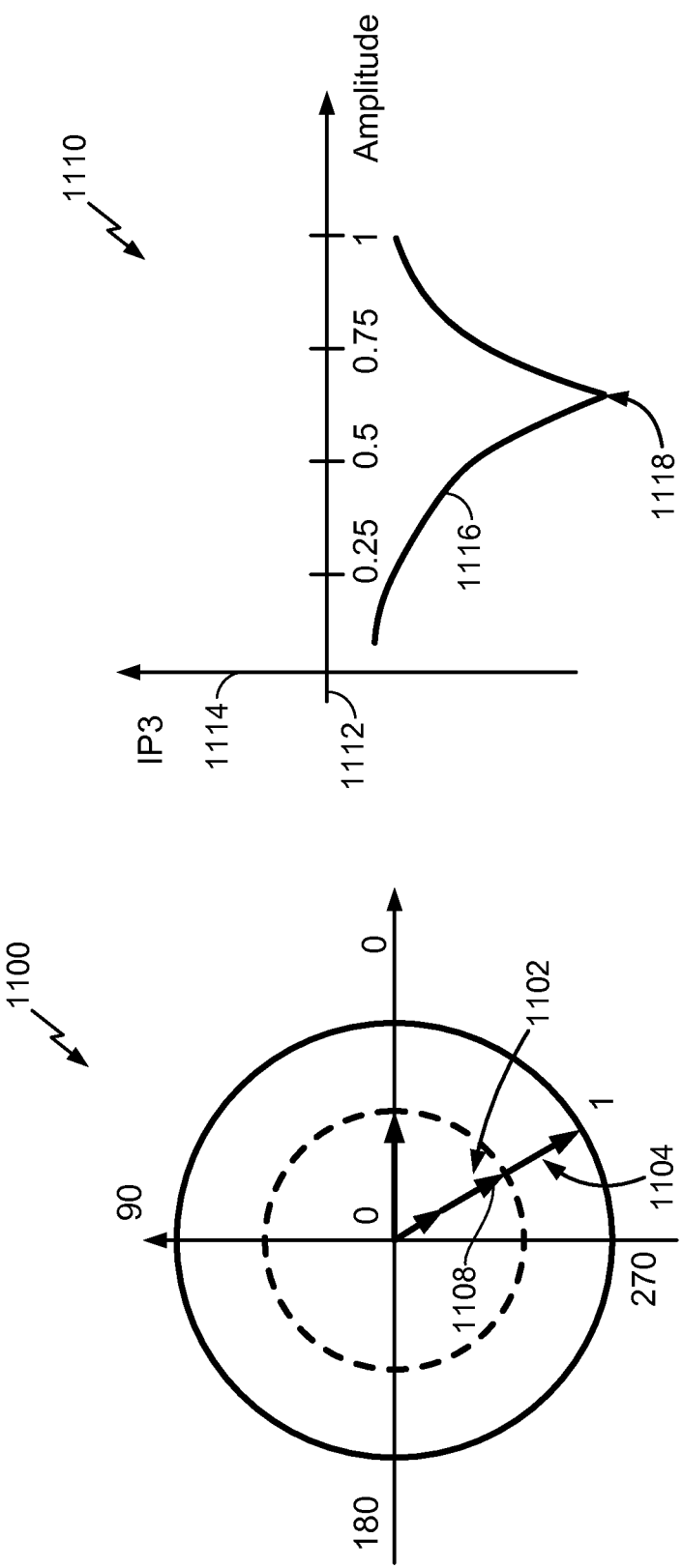
FIGS. 11A and 11B are diagrams illustrating the ability of an exemplary embodiment of the quadrature current-combining linearizing circuit to locate a desired amplitude at a fixed phase.

FIGS. 11A and 11B are diagrams illustrating the ability of an exemplary embodiment of the quadrature current-combining linearizing circuit to locate a desired amplitude at a fixed phase. The coordinate system 1100 shows a fixed arbitrary phase 1102, and a series of vectors 1104 that are swept through an amplitude range, arbitrarily set between magnitude 0 and magnitude 1. The graph 1110 shows amplitude on the abscissa 1112 and third order distortion on the ordinate 1114. The trace 1116 represents the third order distortion as the amplitude is swept from a normalized magnitude of 0 to magnitude 1, where a steep null 1118 is located approximately less than midway between magnitude 0.5 and magnitude 0.75 in this example. The vector 1108 corresponding to the steep null 1118 is shown in FIG. 11A, and is located at a phase described above in FIGS. 10A and 10B.

Figure 12:
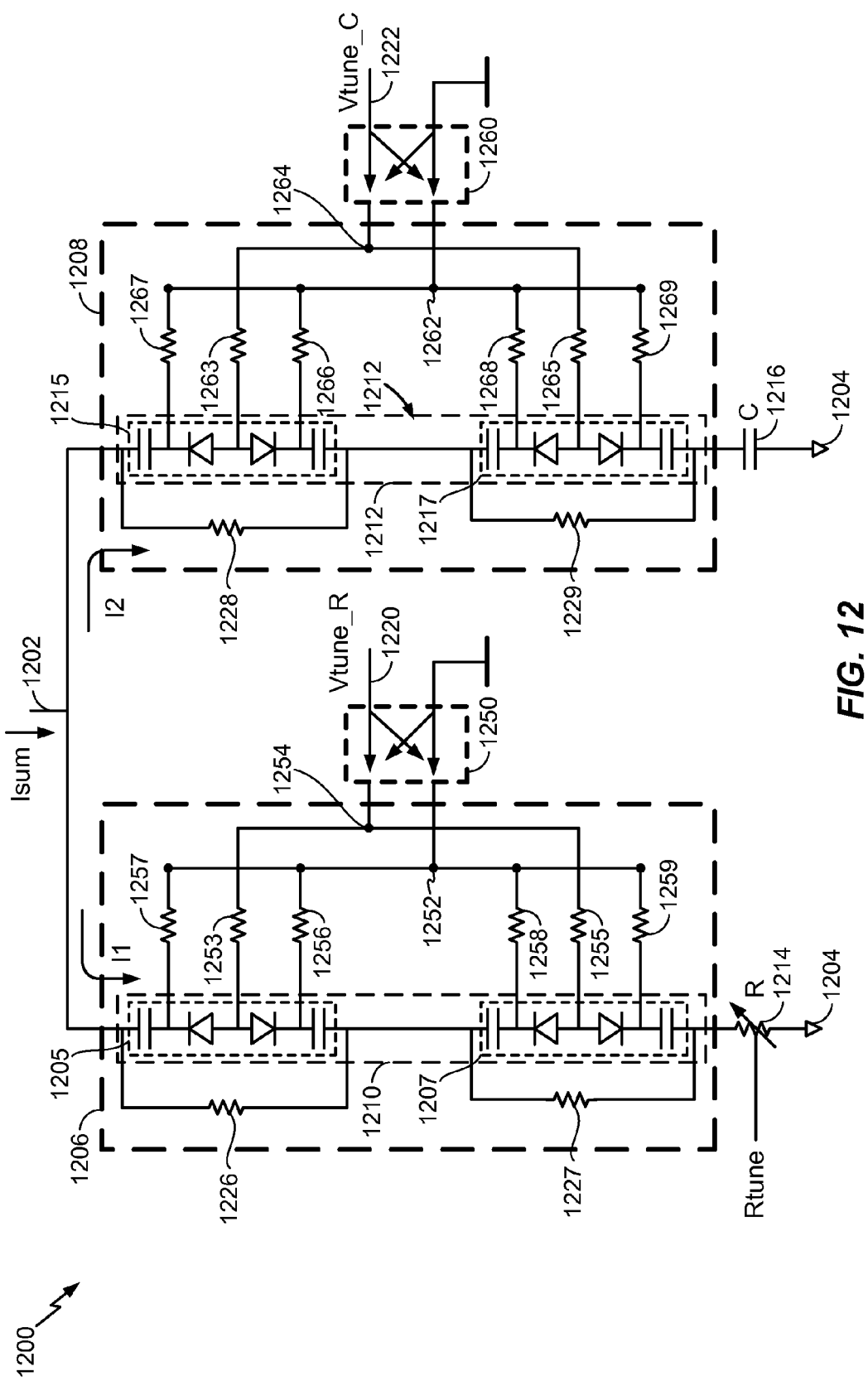
FIG. 12 is a schematic diagram illustrating an alternative exemplary embodiment of the linearizing circuit of FIG. 7A.

FIG. 12 is a schematic diagram illustrating an alternative exemplary embodiment of the linearizing circuit of FIG. 7A.

The circuit 1200 comprises a first node 1202 and a second node 1204. The first node 1202 is referred to as a summing node and the second node 1204 is connected to a common terminal. The circuit 1200 also comprises a first circuit path 1206, through which a first current, I1, flows, and a second circuit path 1208 through which a second current, I2, flows. The first circuit path 1206 includes a first varactor circuit 1210 and the second circuit path 1208 includes a second varactor circuit 1212. The first varactor circuit 1210 comprises diode groups 1205 and 1207, and the second varactor circuit 1212 comprises diode groups 1215 and 1217. In an exemplary embodiment, each of the diode groups 1205, 1207, 1215 and 1217 comprises two diodes and two capacitors. However, more or fewer diodes and capacitors can be implemented in each diode group. Resistances 1226 and 1227 associated with the varactor circuit 1210, and resistances 1228 and 1229 associated with the varactor circuit 1212 establish the electrical behavior of the varactor circuit 1210 and varactor circuit 1212, respectively. However, the first varactor circuit 1210 and the second varactor circuit 1212 include additional connections to allow each of the first varactor circuit 1210 and the second varactor circuit 1212 to be connected in either a common-anode arrangement or a common-cathode arrangement.

The linearizing circuit 1200 comprises a first cross-switch 1250 and a second cross-switch 1260. The first cross-switch 1250 allows the tuning voltage, VtuneR to be applied from connection 1220 to either a common-anode configuration of the first varactor circuit 1210, or to a common-cathode configuration of the first varactor circuit 1210. In a common-cathode configuration, the tuning voltage, VtuneR is directed to the varactor circuit 1210 via node 1252 and resistances 1256, 1257, 1258 and 1259. In a common-anode configuration, the tuning voltage, VtuneR is directed to the varactor circuit 1210 via node 1254 and resistances 1253 and 1255. Similarly, the second cross-switch 1260 allows the tuning voltage, VtuneC to be applied from connection 1222 to either a common-anode configuration of the second varactor circuit 1212, or to a common-cathode configuration of the second varactor circuit 1212. In a common-cathode configuration, the tuning voltage, VtuneC is directed to the varactor circuit 1212 via node 1262 and resistances 1266, 1267, 1268 and 1269. In a common-anode configuration, the tuning voltage, VtuneC is directed to the varactor circuit 1212 via node 1264 and resistances 1263 and 1265. The first cross-switch 1250 and the second cross-switch 1260 allows the phase of the signal on the summing node 1202 to be flipped 180 degrees, while still allowing only positive values for the tuning voltage VtuneR and VtuneC. In this embodiment, the values of both the selectable resistance 1214 and the selectable capacitance 1216 can be chosen based on system design parameters to achieve the desired phase difference between the current I1 and the current I2 and the amplitude in the currents I1 and I2.

Figure 13:
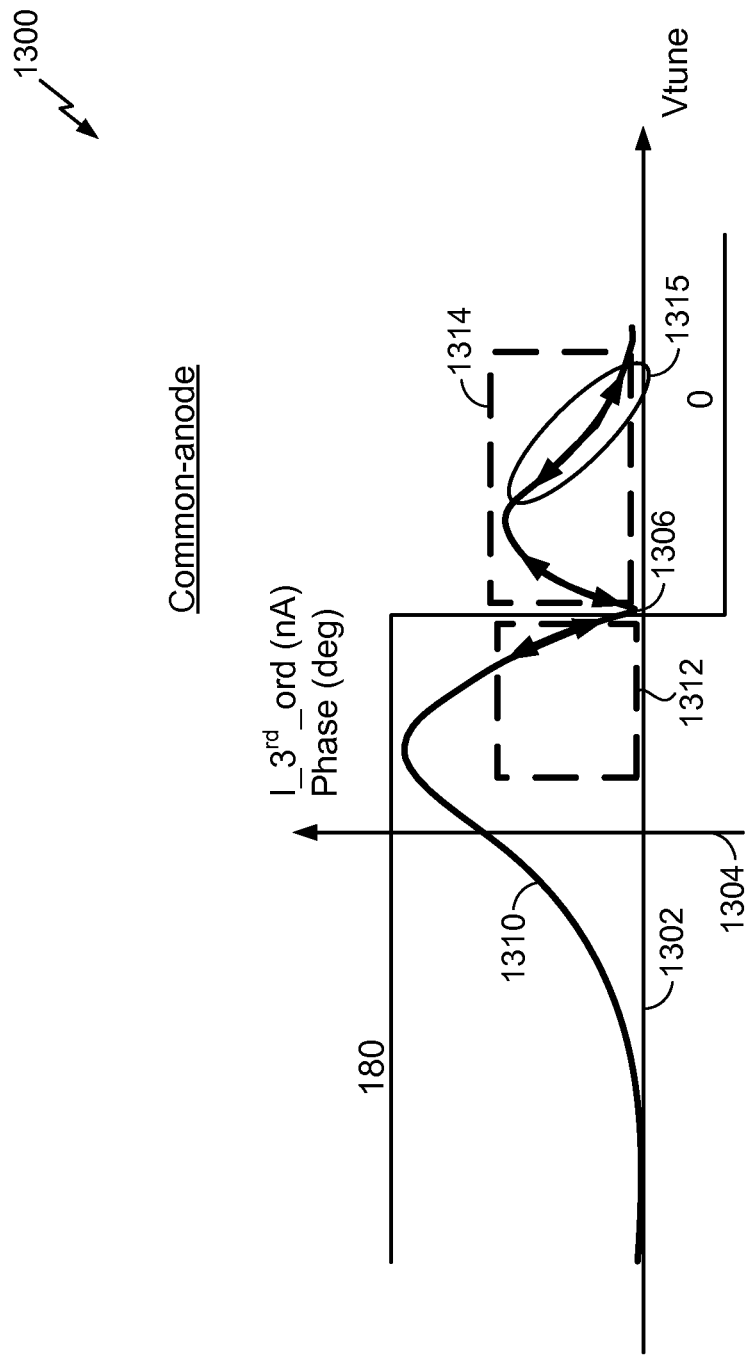
FIG. 13 is a diagram illustrating the tuning voltage VtuneR and VtuneC for common-anode exemplary embodiments of the tuning circuit.

FIG. 13 is a diagram illustrating the tuning voltage VtuneR and VtuneC for common-anode exemplary embodiments of the tuning circuit. The diagram 1300 shows tuning voltage, Vtune, on the abscissa 1302 and shows the third order phase and amplitude on the ordinate 1304. The third order distortion current is shown using curve 1310. In a common-anode configuration as described above, and a positive tuning voltage Vtune, the regions 1312 and 1314 are the available regions for tuning the linearizing circuit. As mentioned above, it is desirable to locate the adjustment provided by the tuning voltage VtuneR and VtuneC away from the inflection point 1306. Therefore, for positive tuning voltages, the region 1315 on the trace 1310 is desirable to use as the region to adjust VtuneR and VtuneC.

Figure 14:
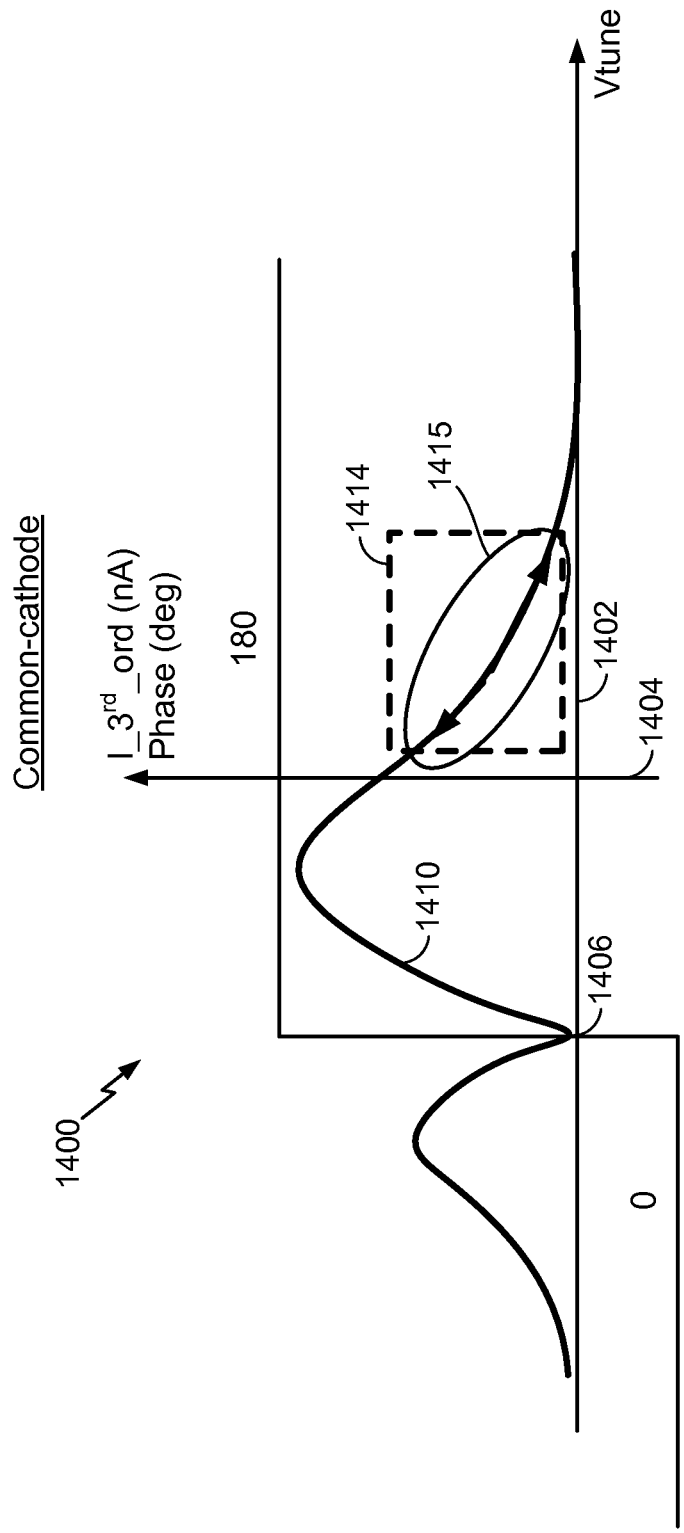
FIG. 14 is a diagram illustrating the tuning voltage VtuneR and VtuneC for common-cathode exemplary embodiments of the tuning circuit.

FIG. 14 is a diagram illustrating the tuning voltage VtuneR and VtuneC for common-cathode exemplary embodiments of the tuning circuit. The diagram 1400 is similar to the diagram 1300 of FIG. 13, but includes additional positive voltage tuning regions made available by the ability to switch the phase of the third order distortion current by 180 degrees using the cross-switch 1250 and/or the cross-switch 1260.

The diagram 1400 shows tuning voltage, Vtune, on the abscissa 1402 and shows the third order phase and amplitude on the ordinate 1404. The third order distortion current is shown using curve 1410. Having the ability to switch between the common-anode configuration and the common-cathode configuration, as described in FIG. 12, allows a broader region over which to use a positive tuning voltage, Vtune. The ability to switch between a common-anode architecture and a common cathode architecture is particularly convenient if the system includes only positive tuning voltage because it places both of the desirable "outer regions" for amplitude tuning and 0/180 phase regions within the range of positive voltage only tuning.

A positive tuning voltage Vtune, is shown as being used in the region 1414 for tuning the linearizing circuit. As mentioned above, it is desirable to place the tuning voltage away from the inflection point 1406. Therefore, for positive tuning voltages, the region 1415 on the trace 1410 is desirable to use as the region to adjust VtuneR and VtuneC.

FIG. 15A is a schematic diagram illustrating another alternative exemplary embodiment of the linearizing circuit of FIG. 7A.

The circuit 1500 comprises a first node 1502 and a second node 1504. The first node 1502 is referred to as a summing node and the second node 1504 is connected to a common terminal. The circuit 1500 also comprises a first circuit path 1506 through which a first current, I1, flows.

The first circuit path 1506 includes a first varactor circuit 1510. The first varactor circuit 1510 comprises diode groups 1505 and 1507. In an exemplary embodiment, each of the diode groups 1505 and 1507 comprises two diodes and two capacitors. However, more or fewer diodes and capacitors can be implemented in each diode group. The first varactor circuit 1510 includes additional connections to allow the first varactor circuit 1510 to be connected in either a common-anode arrangement or a common-cathode arrangement. Resistances 1526 and 1527 associated with the varactor circuit 1510 establish the electrical behavior of the varactor circuit 1510.

The linearizing circuit 1500 comprises a first cross-switch 1550. The first cross-switch 1550 allows the tuning voltage, VtuneR to be applied from connection 1520 to either a common-anode configuration of the first varactor circuit 1510, or to a common-cathode configuration of the first varactor circuit 1510, as described above in FIG. 13. The first cross-switch 1550 allows the phase of the signal on the summing node 1502 to be flipped 180 degrees, while still allowing only positive values for the tuning voltage VtuneR. The linearizing circuit 1500 provides a single-branch circuit that allows the phase of the third order distortion current on the summing node 1502 to be adjusted by selecting the value of the tuning resistance Rtune 1514.

The phase of the third order distortion current on the summing node 1502 can be flipped 180 degrees by controlling whether the tuning voltage, VtuneR is applied to a common-anode varactor arrangement or a common-cathode varactor arrangement. If the tuning quadrant is known within +/−45 degrees, then it is possible to fix the value of the tuning voltage, VtuneR, and select the value of the tuning resistance, Rtune, to adjust the phase in a single quadrant. If tuning in two quadrants is desired, then the cross-switch 1550 can be used to select a quadrant that is 180 degrees out of phase with the first quadrant. The tuning voltage, VtuneR adjusts the amplitude of the third order distortion current and the value of the tuning resistance, Rtune, adjusts the phase of the third order distortion current.

FIG. 15B is a graphical diagram showing example tuning of the linearizing circuit of FIG. 15A. The graph 1560 shows a polar plot of the magnitude and the phase of the third order distortion current as the tuning voltage, VtuneR is held constant and the value of the tuning resistance Rtune 1514 is adjusted. The profile for the traces 1562 and 1564 represent the polar plot trajectories for common-anode and common-cathode configurations respectively.

Figure 16:
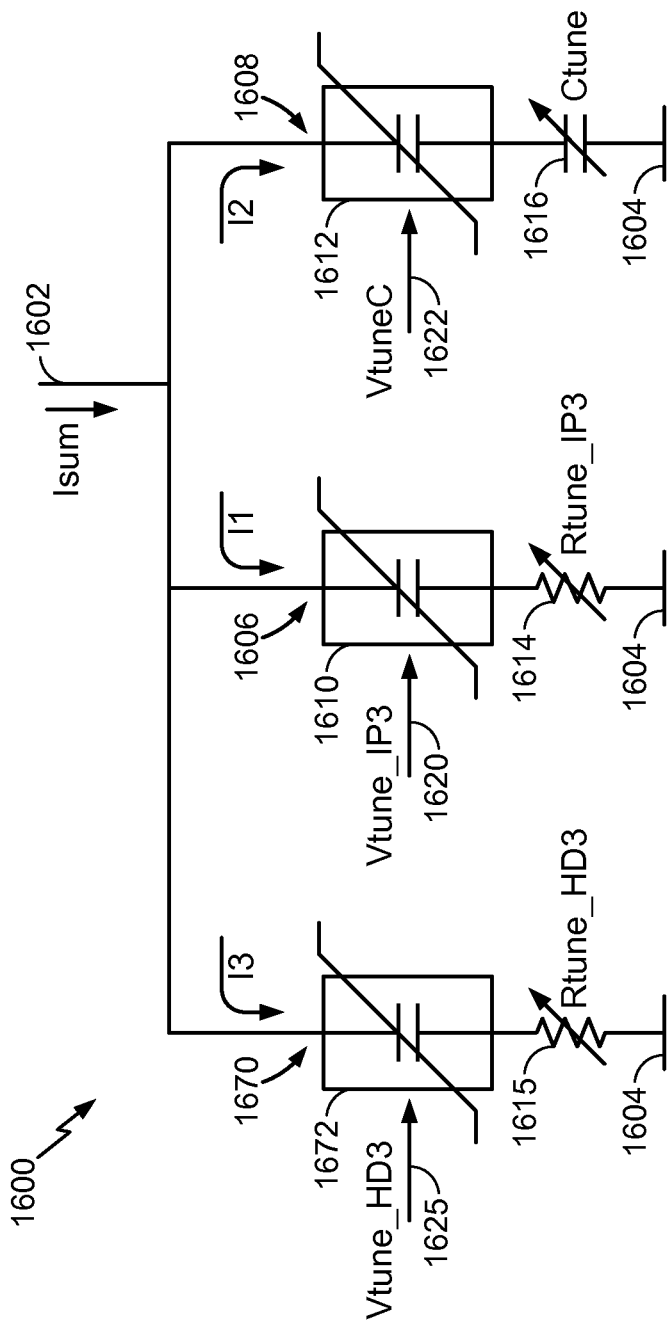
FIG. 16 is a schematic diagram illustrating another alternative exemplary embodiment of the linearizing circuit of FIG. 7A.

FIG. 16 is a schematic diagram illustrating another alternative exemplary embodiment of the linearizing circuit of FIG. 7A. The linearizing circuit 1600 is shown schematically as having three branches, instead of the two branches illustrated in FIG. 7A. The linearizing circuit 1600 can generate an arbitrary phase and amplitude and can be used to cancel both third order harmonic distortion (HD3) and third order intermodulation distortion (IM3) in a radio frequency (RF) transceiver.

The circuit 1600 comprises a first node 1602 and a second node 1604. The first node 1602 is referred to as a summing node and the second node 1604 is connected to a common terminal. The circuit 1600 comprises a first circuit path 1606, through which a first current, I1, flows, a second circuit path 1608 through which a second current, I2, flows, and in this exemplary embodiment, a third circuit path 1670, through which a third current, I3, flows. The first circuit path 1606 includes a first varactor circuit 1610, the second circuit path 1608 includes a second varactor circuit 1612 and the third circuit path 1670 includes a third varactor circuit 1672. In this exemplary embodiment, the first varactor circuit 1610, the second varactor circuit 1612, and the third varactor circuit 1672 can be connected in either of a common-anode arrangement or a common-cathode arrangement, as described above. Moreover, although illustrated in a simplified schematic format, the first varactor circuit 1610, the second varactor circuit 1612, and the third varactor circuit 1672 are similar to the exemplary embodiments of the varactor circuits described above.

The first circuit path 1606 comprises a selectable resistance 1614 (Rtune_IP3), the second circuit path 1608 comprises a selectable capacitance 1616 (Ctune) and the third circuit path 1670 comprises a selectable resistance 1615 (Rtune_HD3). In this exemplary embodiment, the first circuit path 1606 can be configured to generate distortion to compensate for third order intermodulation distortion (IP3)

and the third circuit path 1670 can be configured to generate distortion to compensate for third order harmonic distortion (HD3).

The three branch linearizer circuit has two different adjustable resistance branches (1606 and 1670) because a different value of resistance is needed to create a quadrature current for third order intermodulation distortion than is needed for third order harmonic distortion. For this reason either the first circuit path 1606 or the third circuit path 1670 are used in conjunction with the second circuit path 1608 at a given time. For example, if it is desirable to cancel HD3 then the third circuit path 1670 and the second circuit path 1608 would be used and a voltage would be applied to the node 1625 (Vtune_HD3). In another example, if it is desired to cancel IP3 then the first circuit path 1606 and the second circuit path 1608 would be used as described above and a voltage would be applied to node 1620 (Vtune_IP3). In an exemplary embodiment, one way to eliminate the unwanted branch's contribution to $3^{rd}$ order distortion current is to set it's Vtune voltage (Vtune_HD_3 at node 1625 or Vtune_IP3 at node 1620) at a sufficiently high voltage within reliability constraints of the available technology so that that the respective circuit path's portion of $3^{rd}$ order distortion current versus Vtune that is settled to zero occurs outside of the desirable portion of the $3^{rd}$ order distortion current (see, for example, the far right of curve 1410 on FIG. 14 and far right of curve 1310 on FIG. 13).

A tuning voltage, Vtune_IP3 is applied to the first varactor circuit 1610 via a tuning node 1620 and a tuning voltage, VtuneC, is applied to the second varactor circuit 1612 via a tuning node 1622. A tuning voltage, Vtune_HD3 is applied to the third varactor circuit 1672 via a tuning node 1625. The current Isum at the summing node 1602 represents the sum of the current I1 flowing through the first circuit path 1606, the current I2 flowing through the second circuit path 1608 and the current I3 flowing through the third circuit path 1670. Therefore, an appropriate tuning voltage applied to the node 1625 (Vtune_HD3) would cause the third circuit path 1670 to contribute no distortion current. Similarly, an appropriate tuning voltage applied to the node 1620 (Vtune_IP3) would cause the first circuit path 1606 to contribute no distortion current.

The quadrature current-combining linearizing circuit described herein may be implemented on one or more ICs, analog ICs, RFICs, mixed-signal ICs, ASICs, printed circuit boards (PCBs), electronic devices, etc. The quadrature current-combining linearizing circuit may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the quadrature current-combining linearizing circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Although selected aspects have been illustrated and described in detail, it will be understood that various substitutions and alterations may be made therein without departing from the spirit and scope of the present invention, as defined by the following claims.

What is claimed is:

1. A device, comprising:
a first circuit path coupled to a first node and a second node, the first circuit path having at least one first varactor circuit configured to receive a first tuning voltage, the first circuit path having a resistor with an adjustable value coupled between the at least one first varactor circuit and one of the first and second nodes; and
a second circuit path coupled to the first node and the second node, the second circuit path having at least one second varactor circuit configured to receive a second tuning voltage, the second circuit path having a capacitor with an adjustable value coupled between the at least one first varactor circuit and one of the first and second nodes, wherein the resistor is configured to adjust a phase shift between a first signal in the first circuit path and a second signal in the second circuit path, and the capacitor is configured to adjust an amplitude for the second signal.

2. The device of claim 1, wherein the resistor is adjusted to create a 90 degree phase shift between the first signal in the first circuit path and the second signal in the second circuit path.

3. The device of claim 1, wherein a distortion signal on the first node comprises a third order distortion current signal.

4. The device of claim 1, further comprising:
circuitry for coupling the first varactor circuit in the first circuit path and the second varactor circuit in the second circuit path in any of a common-anode configuration and a common-cathode configuration;
a first cross-switch associated with the first varactor circuit in the first circuit path;
a second cross-switch associated with the second varactor circuit in the second circuit path; and
wherein the first and second cross-switches allow the respective first and second tuning voltages to be applied to the respective first and second varactor circuits in any of the common-anode configuration and the common-cathode configuration.

5. The device of claim 3, further comprising:
a third circuit path configured to receive a third tuning voltage, wherein the third circuit path comprises an additional resistor having an adjustable value, the third circuit path operable with the second circuit path to cancel an additional third order distortion current signal.

6. The device of claim 5, wherein the third order distortion current signal comprises third order intermodulation distortion (IM3) and the additional third order distortion current signal comprises third order harmonic distortion (HD3).

7. A device, comprising:
a circuit path having a first node and a second node, the circuit path between the first node and the second node comprising at least one varactor circuit and a resistor having an adjustable value, the circuit path configured to receive a tuning voltage, wherein the adjustable value is chosen to adjust a phase of a distortion signal on the first node;
circuitry for coupling the at least one varactor circuit in any of a common-anode configuration and a common-cathode configuration;
a cross-switch associated with the at least one varactor circuit in the first circuit path; and
wherein the cross-switch allows the tuning voltage to be applied to the at least one varactor circuit in any of the common-anode configuration and the common-cathode configuration.

8. The device of claim 7, wherein the tuning voltage adjusts an amplitude of the distortion signal on the first node.

9. The device of claim 8, wherein the distortion signal on the first node comprises a third order distortion current signal.

10. A method comprising:
coupling a first circuit path and a second circuit path together at a first node and at a second node, each circuit path comprising at least one varactor circuit;
applying a first tuning voltage to the first circuit path to generate a first current in the first circuit path;
applying a second tuning voltage to a second circuit path to generate a second current in the second circuit path;
adjusting a resistance in the first circuit path to create a phase difference between the first current and the second current; and
adjusting a capacitance in the second circuit path to create a desired amplitude for the second current.

11. The method of claim 10, further comprising creating a 90 degree phase shift between the first current and the second current.

12. The method of claim 10, further comprising:
coupling the varactor circuit in the first circuit path and the varactor circuit in the second circuit path in any of a common-anode configuration and a common-cathode configuration; and
applying the respective first and second tuning voltages to the respective first and second varactor circuits in any of the common-anode configuration and the common-cathode configuration.

13. A device, comprising:
means for coupling a first circuit path and a second circuit path together at a first node and at a second node, each circuit path comprising at least one varactor circuit;
means for generating a first current in the first circuit path;
means for generating a second current in the second circuit path;
means for creating a phase difference between the first current and the second current; and
means for creating a desired amplitude for the second current.

14. The device of claim 13, further comprising means for creating a 90 degree phase shift between the first current and the second current.

15. The device of claim 14, wherein the signal on the first node comprises a third order distortion current signal.

16. The device of claim 13, further comprising:
means for coupling the varactor circuit in the first circuit path and the varactor circuit in the second circuit path in any of a common-anode configuration and a common-cathode configuration; and
means for applying the respective first and second tuning voltages to the respective first and second varactor circuits in any of the common-anode configuration and the common-cathode configuration.

17. The device of claim 15, further comprising:
means for coupling a third circuit path between the first node and the second node;
means for configuring the third circuit path to receive a third tuning voltage;
means for coupling an additional adjustable resistance in the third circuit path; and
means for adjusting the additional adjustable resistance in the third circuit path to cancel an additional third order distortion current signal.

18. The device of claim 17, wherein the third order distortion current signal comprises third order intermodulation distortion (IM3) and the additional third order distortion current signal comprises third order harmonic distortion (HD3).

* * * * *